(12) United States Patent
Huang et al.

(10) Patent No.: US 10,725,266 B2
(45) Date of Patent: Jul. 28, 2020

(54) MOVING-COIL CLOSED-LOOP AUTO-FOCUSING CAMERA MODULE WITH LOW MAGNETIC INTERFERENCE

(71) Applicant: PowerGate Optical Inc., Zhubei, Hsinchu County (TW)

(72) Inventors: Ying Chun Huang, Zhubei (TW); Yu Chia Chen, Zhubei (TW); Hsieh Jen Chuang, Zhubei (TW); Te Pao Ho, Zhubei (TW); Shih Chan Wen, Zhubei (TW)

(73) Assignee: PowerGate Optical Inc., Hsinchu (TW)

( * ) Notice: Subject to any disclaimer, the term of this patent is extended or adjusted under 35 U.S.C. 154(b) by 142 days.

(21) Appl. No.: 15/973,273

(22) Filed: May 7, 2018

(65) Prior Publication Data
US 2018/0329170 A1    Nov. 15, 2018

(30) Foreign Application Priority Data
May 11, 2017   (TW) .............................. 106206702 U

(51) Int. Cl.
| | |
|---|---|
| *G02B 7/02* | (2006.01) |
| *G02B 7/09* | (2006.01) |
| *G02B 7/10* | (2006.01) |
| *G01D 5/14* | (2006.01) |
| *H01F 7/06* | (2006.01) |
| *G03B 13/36* | (2006.01) |

(Continued)

(52) U.S. Cl.
CPC ............... *G02B 7/09* (2013.01); *G01D 5/145* (2013.01); *G02B 7/10* (2013.01); *G03B 3/10* (2013.01); *G03B 13/36* (2013.01); *H01F 7/0289* (2013.01); *H01F 7/06* (2013.01); *H01F 7/066* (2013.01); *G02B 27/646* (2013.01); *G03B 2205/0069* (2013.01)

(58) Field of Classification Search
CPC ...... G02B 7/021; G02B 3/0075; G02B 7/006; G02B 13/001; G02B 13/004; G02B 5/201; G02B 27/646; G02B 7/08; G02B 7/09; G02B 13/003; G02B 7/023; G02B 7/04; G02B 7/102; G02B 13/06; G02B 19/0076; G02B 7/022; G02B 7/10; G02B 7/06; G02B 9/04
USPC ........ 359/265–267, 315, 321–322, 290–292, 359/811, 813, 815, 822–824
See application file for complete search history.

(56) References Cited

U.S. PATENT DOCUMENTS

| | | | |
|---|---|---|---|
| 2017/0038600 A1* | 2/2017 | Hee ...................... | G02B 27/646 |
| 2018/0113378 A1* | 4/2018 | Wang ................... | G03B 19/023 |

\* cited by examiner

*Primary Examiner* — Brandi N Thomas

(57) ABSTRACT

A moving-coil closed-loop auto-focusing module with low magnetic interference includes an upper cover, a base frame, a lens module, an elastic module, at least one coil, at least one pair of two opposing driving magnets, an external circuit and at least one sensor magnet. The coil surrounds the lens module. The two driving magnets are located individually at respective lateral sides of the base frame in correspondence with the coil. The external circuit located under the base frame includes an image-sensing element and at least one sensor. The sensor magnet is mounted peripherally to the lens module, and has magnetic lines parallel to the optical image-capturing axis, such that a magnetizing surface of the sensor magnet can face downward to align the sensor on the external circuit. Thereupon, the lens module can be controlled to displace along an optical image-capturing axis in a closed-loop manner.

16 Claims, 51 Drawing Sheets

(51) Int. Cl.
*G03B 3/10* (2006.01)
*H01F 7/02* (2006.01)
*G02B 27/64* (2006.01)

MOVING-COIL CLOSED-LOOP AUTO-FOCUSING CAMERA MODULE WITH LOW MAGNETIC INTERFERENCE

This application claims the benefit of Taiwan Patent Application Serial No. 106206702, filed on May 11, 2017, the subject matter of which is incorporated herein by reference.

BACKGROUND OF INVENTION

1. Field of the Invention

The invention relates to a moving-coil closed-loop auto-focusing module with low magnetic interference, and more particularly to the moving-coil closed-loop auto-focusing module that achieves a goal of quick focusing by applying a sensor magnet and a sensor on an external circuit to detect displacements of a lens module in an optical image-capturing axis.

2. Description of the Prior Art

Progress in relative technology has minimized a size of digital camera. Currently, thanks to minimization of modern lens modules, various small-sized electronic devices (smart phones for example) can provide digital image-capturing functions. However, one of popular micro lens sets adopted by these electronic devices is the voice coil motor (VCM), which includes a coil, a magnet and a spring plate to mount a lens module, and which can move back and forth in an optical image-capturing axis so as to zoom or focus automatically. In addition, demands in image-capturing quality and more advanced functions for these electronic devices with individual lens modules are rising, including ten-million pixels, anti-hand shake and so on, by which high-end and low-end products can be told.

In a conventional optical system consisted of a lens module and an image-compensating module, such as camera or video recorders, some unexpected foreign forcing or hand shakes may lead to bias of an optical path, and also cause unstable imaging at the image-compensating module. In other words, an obscure image might be inevitable. One of resolutions is to provide a relevant compensation mechanism to amend the obscure image caused by the aforesaid shakes or forcing, so that a better image can be obtained. In the art, the compensation mechanism can be a digital compensation mechanism or an optical compensation mechanism.

The aforesaid digital compensation mechanism is to analyze and process digital image data captured by the image-compensating module, so as to obtain a much clearer digitalized image. In the art, the related means is usually called as a digital anti-shake mechanism. Regarding the optical compensation mechanism, a shake-compensating device is generally furnished to an optical lens set or an image-compensating module. The resulted formulation is usually called as an optical anti-shake mechanism. However, currently, the electromagnetic coil adopted in a conventional optical anti-shake mechanism, or the coil used in the VCM, is generally electrically coupled with elastic elements or hard/flexible circuit boards by soldering.

Nevertheless, in this industry, the dual-lens module has become one of newer modules introduced to the smart phones, the optical zooming is now one of popular camera functions, and the closed-loop OIS is proved helpfully to the high-multiple optical zooming. It is noticed that the conventional image-capturing module features in poor capability against the magnetic interference, and, on the other hand, the dual-lens module should be kept distantly by predetermined spacing before an acceptable ability against the magnetic interference can be obtained. Thus, in design, it is crucial in the related art to provide an improvement that can reduce the sensitivity with respect to foreign magnetic fields, and can lower the effect of magnetic field interference upon the motors at the same time.

In particular, the closed-loop system, as one of current trends, features in quick focusing, precision zooming and multi-axial compensation control. Since detection of lens focusing requires addition of Hall sensors at the movable part for detecting Gauss value of the magnetic field thereof so as able to obtain the corresponding position of the lens, thus it is the primary object of the present invention to prevent the sensor magnets on the movable part from possible magnetic interference.

SUMMARY OF THE INVENTION

Accordingly, it is the primary object of the present invention to provide a moving-coil closed-loop auto-focusing module with low magnetic interference, that applies a sensor magnet fixed at a lens, via at least one sensor on an external circuit, to confirm a correct position of the lens displacing in an optical image-capturing axis, and that, through a preferred arrangement of magnetic fields, the magnetic interference between the sensor magnet and the driving magnets can be effectively reduced.

In the present invention, the moving-coil closed-loop auto-focusing module with low magnetic interference, defined with an X axis, a Y axis and a Z axis, perpendicular to each other, having an optical image-capturing axis parallel to the Z axis, includes an upper cover, a base frame, a lens module, an elastic module, at least one coil, at least one pair of two opposing driving magnets, an external circuit, and at least one sensor magnet. The upper cover includes a through hole. The base frame engages the upper cover to form an internal accommodation space. The lens module is located inside the accommodation space. The elastic module includes an upper spring plate and a lower spring plate to clamp the lens module inside the base frame, and further confines elastically the lens module to be slidable along the optical image-capturing axis within the accommodation space. The coil surrounds the lens module. The two driving magnets are located individually at respective lateral sides of the base frame in correspondence with the coil. The external circuit located under the base frame includes an image-sensing element and at least one sensor. The sensor magnet located peripherally to the lens module has magnetic lines parallel to the optical image-capturing axis. Thereupon, a magnetizing surface of the sensor magnet can face downward to align the sensor on the external circuit.

All these objects are achieved by the moving-coil closed-loop auto-focusing module with low magnetic interference described below.

BRIEF DESCRIPTION OF THE DRAWINGS

The present invention will now be specified with reference to its preferred embodiment illustrated in the drawings, in which.

DESCRIPTION OF THE PREFERRED EMBODIMENTS

The invention disclosed herein is directed to a moving-coil closed-loop auto-focusing module with low magnetic interference. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
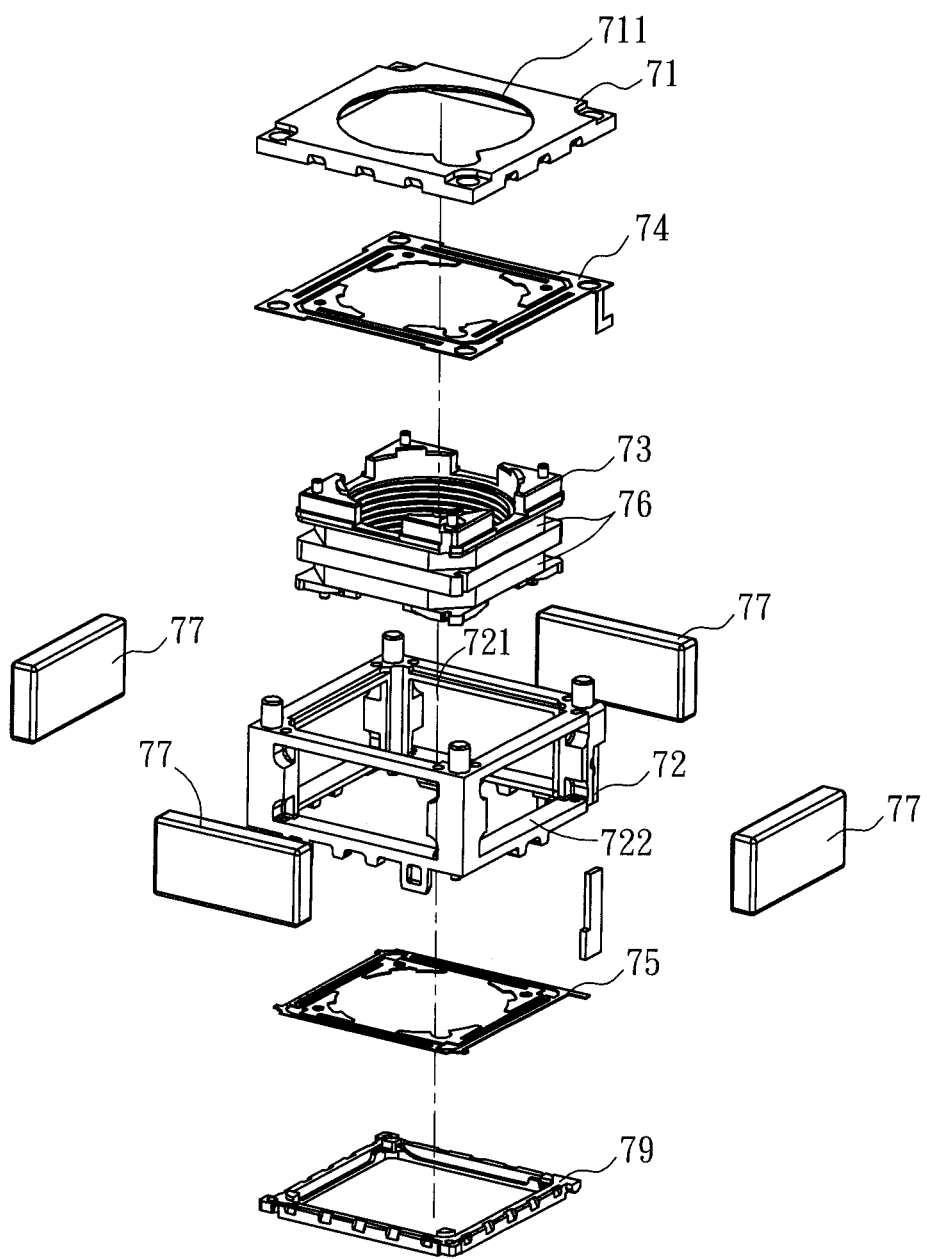
FIG. 1 is a schematic exploded view of a basic framework of the moving-coil auto-focusing camera module.

Referring now to FIG. 1, a schematic exploded view of a basic framework of the moving-coil auto-focusing camera module is shown. Generally in the art, the moving-coil auto-focusing camera module 7 is basically structured to include an upper cover 71, a base frame 72, a lens module 73, an upper spring plate 74, a lower spring plate 75, at least one coil 76, two pairs of opposite driving magnets 77, a connection plate 78 and a fixation frame 79. The upper cover 71 including a through hole 711 is integrated with the base frame 72 to form thereinside an accommodation space 721. The lens module 73 is disposed inside the accommodation space 721. The lens module 73 is elastically clamped between the upper spring plate 74 and the lower spring plate 75, and the combination of the aforesaid three are mounted spatially into the base frame 72 with the upper cover 71 and the lower fixation frame 79. The lens module 73 is elastically confined inside the accommodation space 721 and, also, slidable axially thereinside. The coil 76 surrounds the lens module 73. The two pairs of opposite driving magnets 77 (i.e., four magnets totally) are mounted individually into corresponding lateral mounting grooves 722 of the base frame 72, thus surround the lens module 73, and position respective to corresponding sides of the coil 76. In addition, the connection plate 78 is applied to couple electrically the upper spring plate 74, the lower spring plate 75 and the coil 76.

Figure 2A:
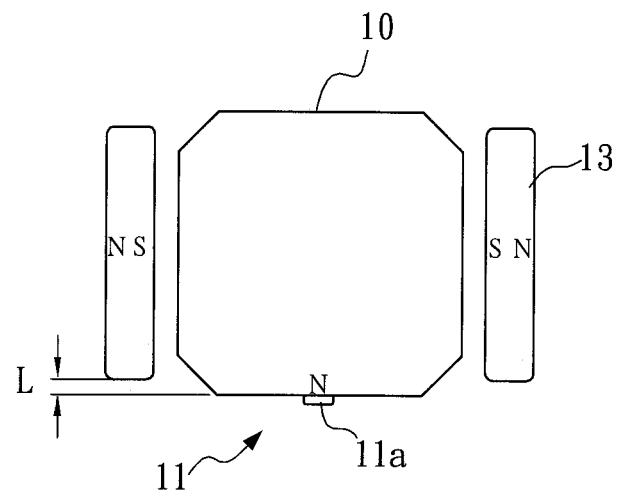
FIG. 2A is a schematic view of an exemplary example of the movable part and a monopolar sensor magnet in accordance with the present invention.
Figure 2B:
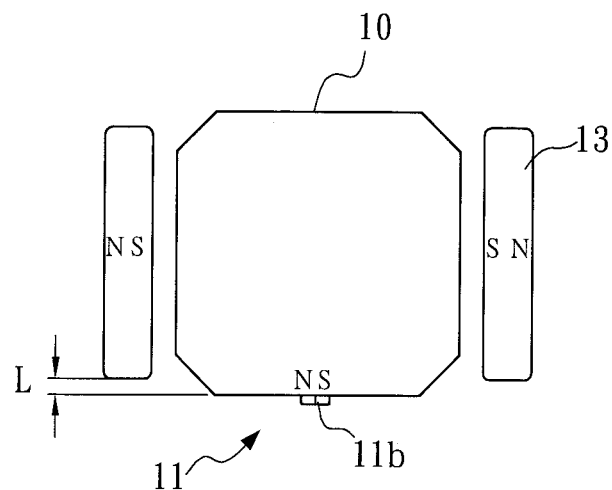
FIG. 2B is a schematic view of an exemplary example of the movable part and a dipolar sensor magnet in accordance with the present invention.

As described above, the basic framework of a typical moving-coil auto-focusing camera module 7 is properly elucidated. Since this basic framework is structurally and functionally known to the art, and thus details thereabout would be omitted herein. Now, refer to FIG. 2A, FIG. 2B and FIG. 3; where FIG. 2A is a schematic view of an exemplary example of the movable part and a monopolar sensor magnet in accordance with the present invention, FIG. 2B is a schematic view of an exemplary example of the movable part and a dipolar sensor magnet in accordance with the present invention, and FIG. 3 demonstrates evaluation results of relationships between the tilt angle of the movable part and the distance from the external magnet to the internal magnet for the exemplary examples of FIG. 2A and FIG. 2B.

Since a sensor magnet 11 is required to be assigned to a movable part 10 so as to perform a Z-axial closed-looping, following evaluation data can be helpful for understanding relative magnetic interference between the sensor magnet and the fixed driving magnet. As shown, FIG. 2A depicts an embodiment that the movable part 10 is furnished with a monopolar sensor magnet 11*a*, and on the other hand FIG. 2B depicts an embodiment that the movable part 10 is furnished with a dipolar sensor magnet 11*b*. In both embodiments, the magnetizing direction of the sensor magnet 11 is parallel to the optical direction (Z axis), the monopolar driving magnet 13 surrounding the movable part 10 has a radial magnetizing direction, and the sensor magnet 11 is moved back and forth with respect to the driving magnet 13 so as to determine the magnetic field interference resulted from closed-looping by judging the corresponding tilt angle.

Figure 3:
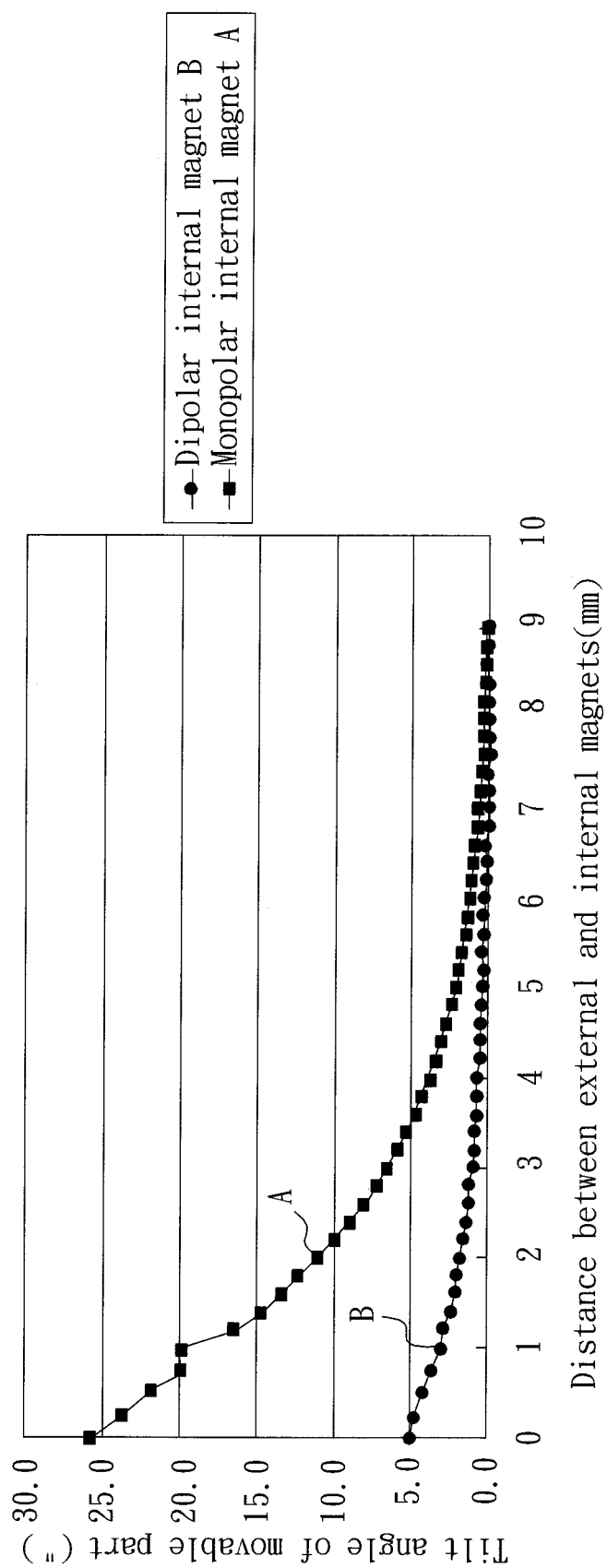
FIG. 3 demonstrates simulation results of relationships between the tilt angle of the movable part and the distance from the external magnet to the internal magnet for the exemplary examples of FIG. 2A and FIG. 2B.

As shown in FIG. 3, from curve A for an internal monopolar sensor magnet, it is found that, when the vertical distance L between the driving magnets 13 and the sensor magnet 11 becomes smaller, the tilt angle becomes larger. Such a large tilt angle is harmful to the minimization and thinning of the driving device. In the circumstance that the distance between the sensor magnet 11 and driving magnet 13 can be made long enough, attractive or repulsive forcing in between would affect performance of the product significantly. Even that the closed-looping is the trend for modern image-capturing lens, such a disadvantage is hard to be overcome for achieving a satisfied image-capturing module. Namely, an effort to avoid the magnetic interference is definitely a top issue in this industry. In FIG. 3, curve B demonstrates evaluation results of an application of a dipolar sensor magnet, instead of the monopolar sensor magnet of curve A. By introducing balanced magnetic forcing, the maximal tilt angle of curve B is lowered to 5". That is to say, the magnetic field interference is improved by 80%.

In the case that the sensor magnet 11 is dipolar and radially magnetized with the same magnetizing direction and driving magnet 13 (plate-type or corner-type driving magnet), the induced magnetic interference would be much smaller. However, since the movable space for the lens module is limited, only a tiny distance can be provided to separate the sensor magnet 11 and the driving magnets 13, and thus the induced magnetic interference would be much serious. In designing the closed-loop dual-lens module, the magnetic fields of these two that face the sensor magnets 11 are interfered to each other, thus from which a satisfied design is hard to achieve. In this present invention, the magnetizing direction of the dipolar sensor magnet 11 is set to be the optical image-capturing axis so as not to be affected by the magnetic field of the radial-magnetized driving magnet 13, and thus further the dual-lens closed-loop OIS module can be easily mounted to an adjacent surface, such that an innovative image-capturing module can be provided.

Figure 4:
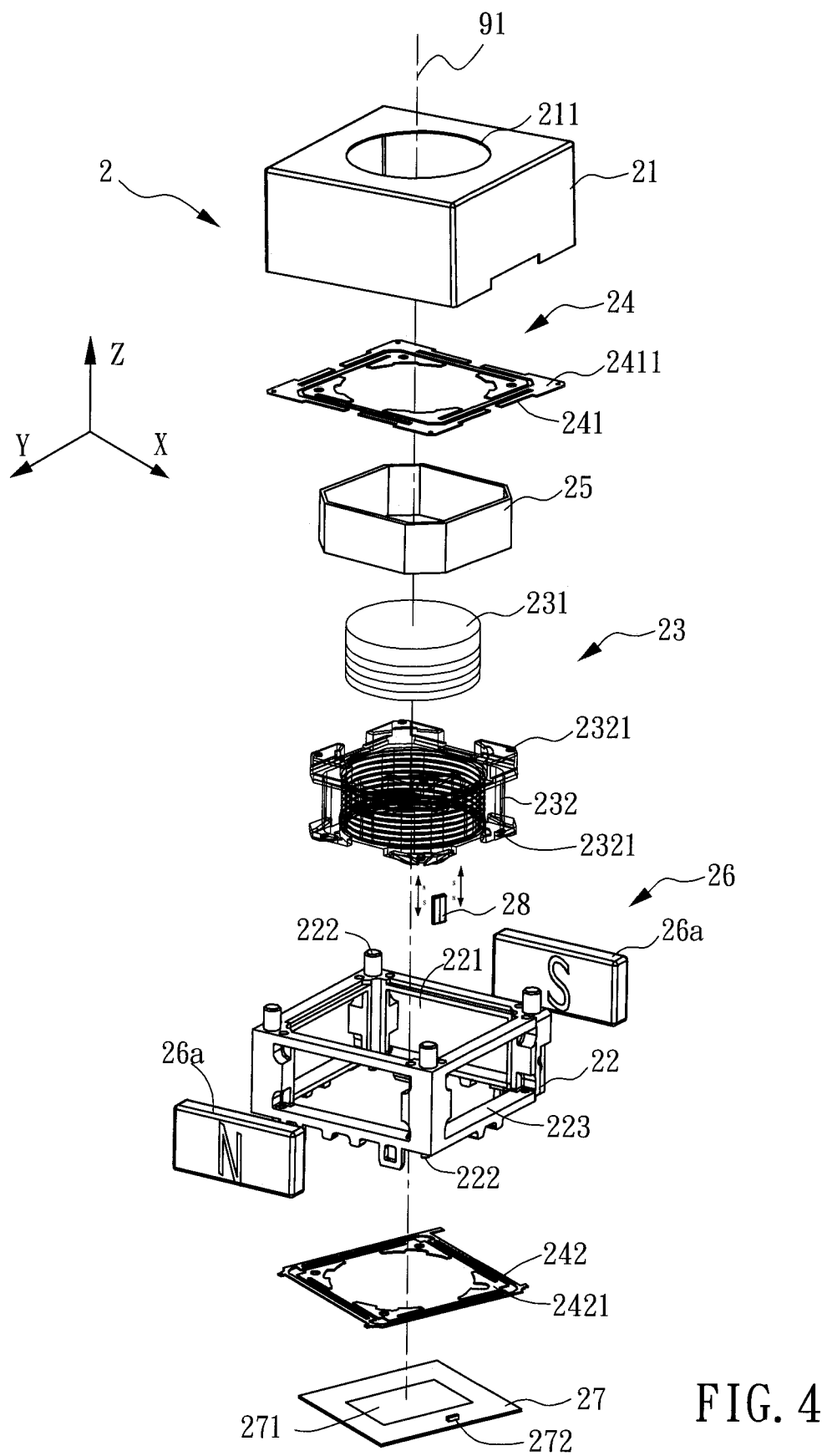
FIG. 4 is a schematic exploded view of the moving-coil closed-loop auto-focusing module with low magnetic interference in accordance with the present invention.

In order to achieve the object of reducing the magnetic interference and closed-looping, at least one dipolar sensor magnet 11*b* is furnished to the sensor magnet 11 of the movable part 10. Referring now to FIG. 4, a schematic exploded view of the moving-coil closed-loop auto-focusing module with low magnetic interference in accordance with the present invention is shown. In the present invention, the moving-coil closed-loop auto-focusing module with low magnetic interference 2 is defined with an orthogonal coordinate system having an X axis, a Y axis and a Z axis, and has an optical image-capturing axis 91 parallel to the Z axis. As shown, the moving-coil closed-loop auto-focusing module with low magnetic interference 2 includes an upper cover 21, a base frame 22, a lens module 23, an elastic module 24, at least one coil 25, at least one pair of opposing driving magnets 26, an external circuit 27, and at least one sensor magnet 28.

The upper cover 21 has a through hole 211. The base frame 22 engaging the upper cover 21 forms a central accommodation space 221. In particular, the base frame 22 is formed as a cubic frame structure, and having four locating pillar 222 located individually at all respective corners of upper and lower surfaces of the base frame 22 for positioning and fixing the base frame 22 to the elastic module 24.

The elastic module 24 including an upper spring plate 241 and a lower spring plate 242 is to clamp elastically therebetween the lens module 23 within the base frame 22, so that the lens module 23 can be elastically confined within the accommodation space 221 and slidable in the optical image-capturing axis 91. The upper spring plate 241 and the lower spring plate 242 are both made of metallic materials, structured as corresponding hollow sheets (spring sheets), and manufactured by mechanical punching, stamping or etching. Each of the upper spring plate 241 and the lower spring plate 242 has four elastic positioning ends 2411, 2421 extending evenly from respective corners thereof to engage the corresponding locating pillars 222 at the respective positions on the upper or lower surface of the base frame 22, such that the lens module 23 can be centrally elastically fixed inside the accommodation space 221.

The lens module 23, mounted inside the accommodation space 221 and kept on the optical image-capturing axis 91, is suspended in the accommodation space 221 formed between the upper cover 21 and the base frame 22, such that the lens module 23 can move back and forth along the optical image-capturing axis 91 inside the base frame 22. In addition, the lens module 23 can utilize the through hole 211 of the upper cover 21 to perform exterior image-capturing along the optical image-capturing axis 91.

The lens module 23 further includes a lens set 231 and a lens carrier 232. The optical image-capturing axis 91 is exactly the optical focusing axis of the lens set 231. The lens set 231 is mounted at a central place of the lens carrier 232, and displaces synchronously with the lens carrier 232. An upper end and a lower end of the lens carrier 232 further include a plurality of locating protrusions 2321 for fixing the upper spring plate 241 and the lower spring plate 242, respectively, and thus the lens carrier 232 can be suspended inside the accommodation space 221 of the base frame 22, and lie along the optical image-capturing axis 91.

As described above, the coil or coils 25 surround the lens module 23. Here, the term "surround" implies to be arranged evenly around a central object in an annular manner. The coil 25 can be annular monopolar coil or an annular dipolar coil, and a flat dipolar coil or a PCB board. The two opposing driving magnets 26 are mounted into corresponding lateral mounting grooves 223 at two opposing sides of the base frame 22, and positioned in correspondence with the coil 25. In this embodiment, the two driving magnets 26 are the monopolar driving magnets 26a. However, in this present invention, the driving magnet 26 can be one of a monopolar driving magnet 26a or a dipolar driving magnet 26b.

The external circuit 27, located under the base frame 22, includes an image-sensing element 271 and at least one sensor 272. The sensor magnet 28 is located at a lateral side peripheral to the lens module 23, and has magnetic lines parallel to the optical image-capturing axis 91, such that a magnetizing surface of the sensor magnet 28 faces downward to target the sensor 272 of the external circuit 27. In this embodiment, the sensor magnet 28 can be a dipolar sensor magnet, symmetrically or asymmetrically magnetized. In this embodiment, the sensor 272 can be a Hall sensor.

In the following embodiments, since a large portion of involved elements are the same as or at least resembled to those in the aforesaid embodiments, thus details thereabout upon the same element or structure in between would be omitted herein. In addition, the same names and numbers would be assigned to elements or structures that are the same in those embodiments, and the same names but labeled by the same numbers tailed by a letter would be assigned to elements or structures that are similar in those embodiments.

Figure 5A:
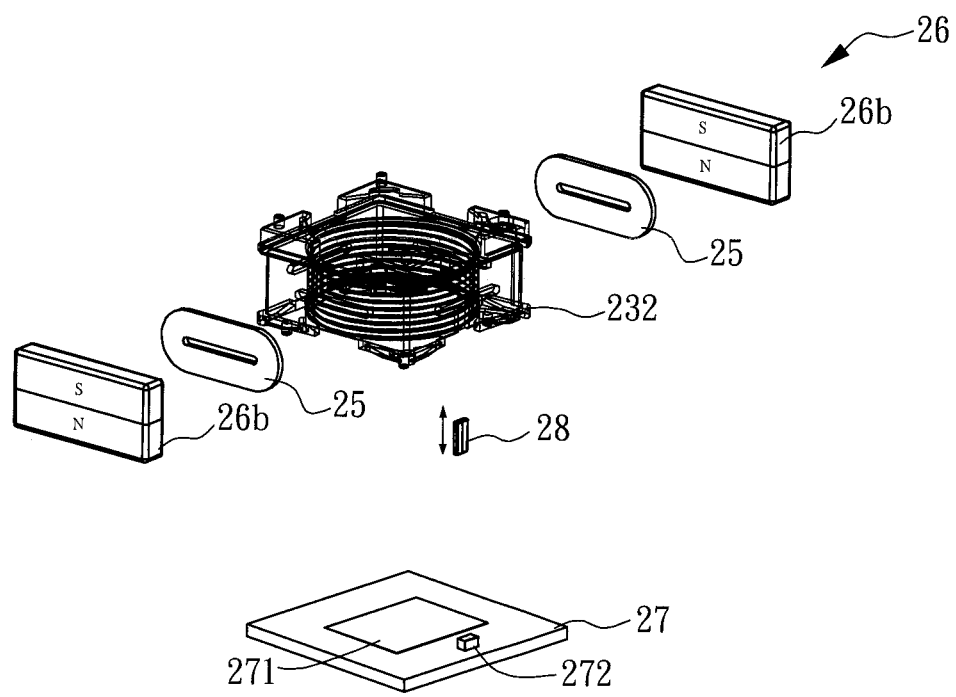
FIG. 5A is a schematic exploded view of a first preferred embodiment of the moving-coil closed-loop auto-focusing module with low magnetic interference in accordance with the present invention.
Figure 5B:
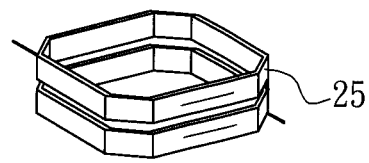
FIG. 5B demonstrates another schematic exploded view of FIG. 5A, but with another type of coils.

Refer now to FIG. 5A and FIG. 5B; where FIG. 5A is a schematic exploded view of a first preferred embodiment of the moving-coil closed-loop auto-focusing module with low magnetic interference in accordance with the present invention, and FIG. 5B demonstrates another schematic exploded view of FIG. 5A but with another type of coils. Major differences between this first preferred embodiment of the moving-coil closed-loop auto-focusing module with low magnetic interference and the embodiment shown in FIG. 4 are in the driving magnets and the coil. In FIG. 5A, the two driving magnets 26 are dipolar driving magnets 26b, and the coil 25 is a flat dipolar coil or a PCB. As shown in FIG. 5B, the coil 25 is an annular dipolar coil.

Figure 6:
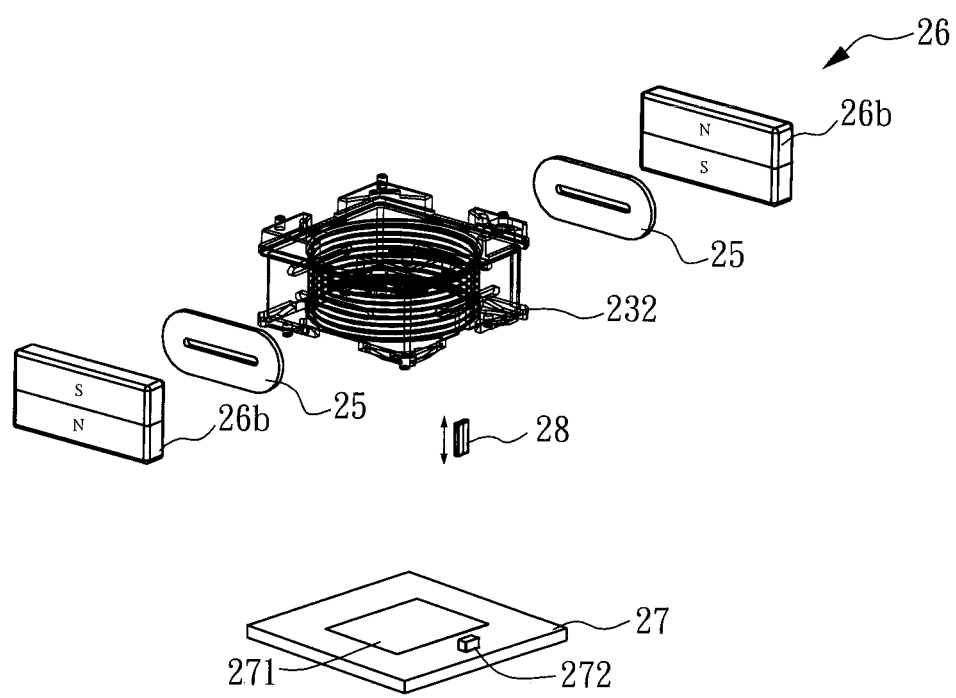
FIG. 6 is a schematic exploded view of a second preferred embodiment of the moving-coil closed-loop auto-focusing module with low magnetic interference in accordance with the present invention.

Referring now to FIG. 6, a schematic exploded view of a second preferred embodiment of the moving-coil closed-loop auto-focusing module with low magnetic interference in accordance with the present invention is shown. A major difference between the second preferred embodiment of the moving-coil closed-loop auto-focusing module with low magnetic interference and the first preferred embodiment of FIG. 5 is that, in this embodiment, when the two driving magnets 26 are the dipolar driving magnets 26b, the corresponding polarities are arranged to N/S or S/N.

Figure 7A:
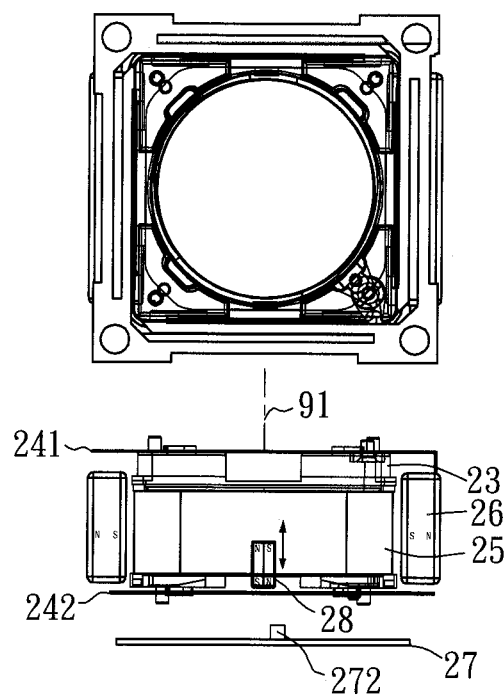
FIG. 7A~FIG. 7C demonstrate individually variations of the arrangement of the sensor and the sensor magnet for the first preferred embodiment of the moving-coil closed-loop auto-focusing module with low magnetic interference in accordance with the present invention.
Figure 7B:
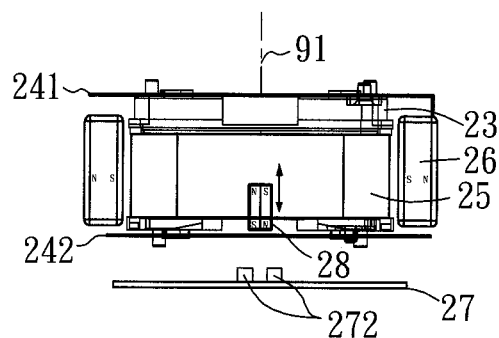
Figure 7C:
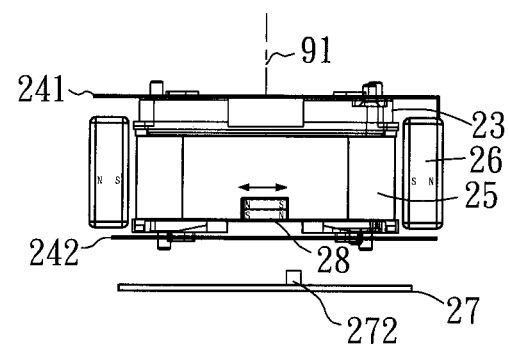

Referring now to FIG. 7A~FIG. 7C, variations of the arrangement of the sensor and the sensor magnet for the first preferred embodiment of the moving-coil closed-loop auto-focusing module with low magnetic interference in accordance with the present invention are individually shown. In FIG. 7A, a dipolar sensor magnet 28 is applied in correspondence with a sensor 272 (Hall sensor), so that the displacement of the lens module 23 in the Z-axial direction can be detected. In FIG. 7B, a dipolar sensor magnet 28 is in correspondence with two sensors 272 (Hall sensors). These two sensors 272 are located to opposing sides under the dipolar sensor magnet 28, so that the displacement of the lens module 23 in the Z-axial direction can be detected. In addition, in FIG. 7C, the sensor magnet 28 has a tangential magnetizing direction, i.e., with magnetic lines thereof perpendicular to the optical image-capturing axis 91, and a corresponding sensor 272 (Hall sensor) is arranged, so that the displacement of the lens module 23 in the Z-axial direction can be detected.

Figure 8:
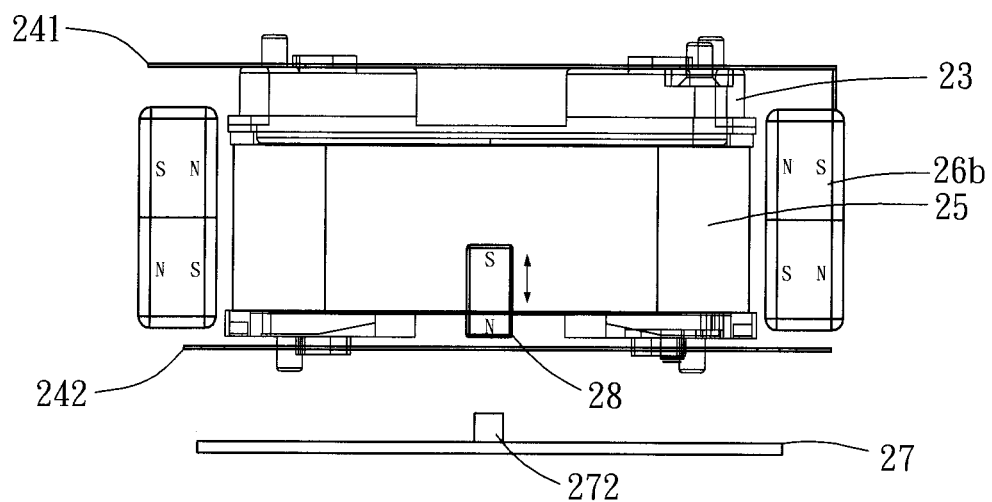
FIG. 8 demonstrates a further variation of the arrangement of the sensor and the sensor magnet for the first preferred embodiment of the moving-coil closed-loop auto-focusing module with low magnetic interference in accordance with the present invention.

Referring now to FIG. 8, a further variation of the arrangement of the sensor and the sensor magnet for the first preferred embodiment of the moving-coil closed-loop auto-focusing module with low magnetic interference in accordance with the present invention is demonstrated. In FIG. 8, the sensor magnet 28 can be monopolar, with a magnetizing direction parallel to the optical image-capturing axis 91 (or a tangential direction), so as to pair the dipolar driving magnet 26b for achieving the reduction in magnetic interference. That is, for performing Z-axis closed-loop feedback control, the sensor magnet 28 is located at a side surface of the lens carrier of the movable part where is no driving magnet 26b being furnished. One of the sensor magnet 28 and the driving magnet 26b is dipolar, or both the sensor magnet 28 and the driving magnet 26b are dipolar in which the neighboring poles of the sensor magnet 28 and the driving magnet 26b are opposite poles; all these variations of embodiments of the present invention can achieve the goal of low magnetic interference, and thus are very advantageous for utilizing the Z-axis closed-loop feedback control of lens module.

Figure 9:
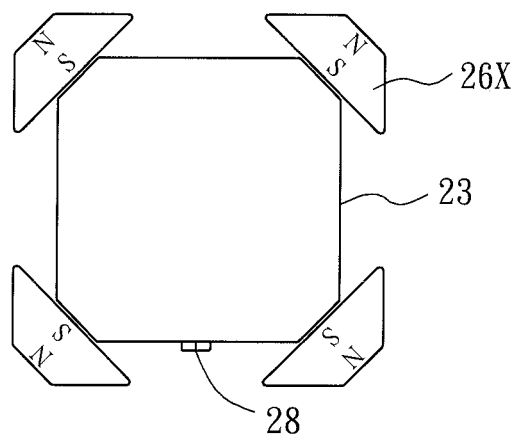
FIG. 9 shows schematically an arrangement of the driving magnets and the sensor magnet for a third preferred embodiment of the moving-coil closed-loop auto-focusing module with low magnetic interference in accordance with the present invention.
Figure 10:
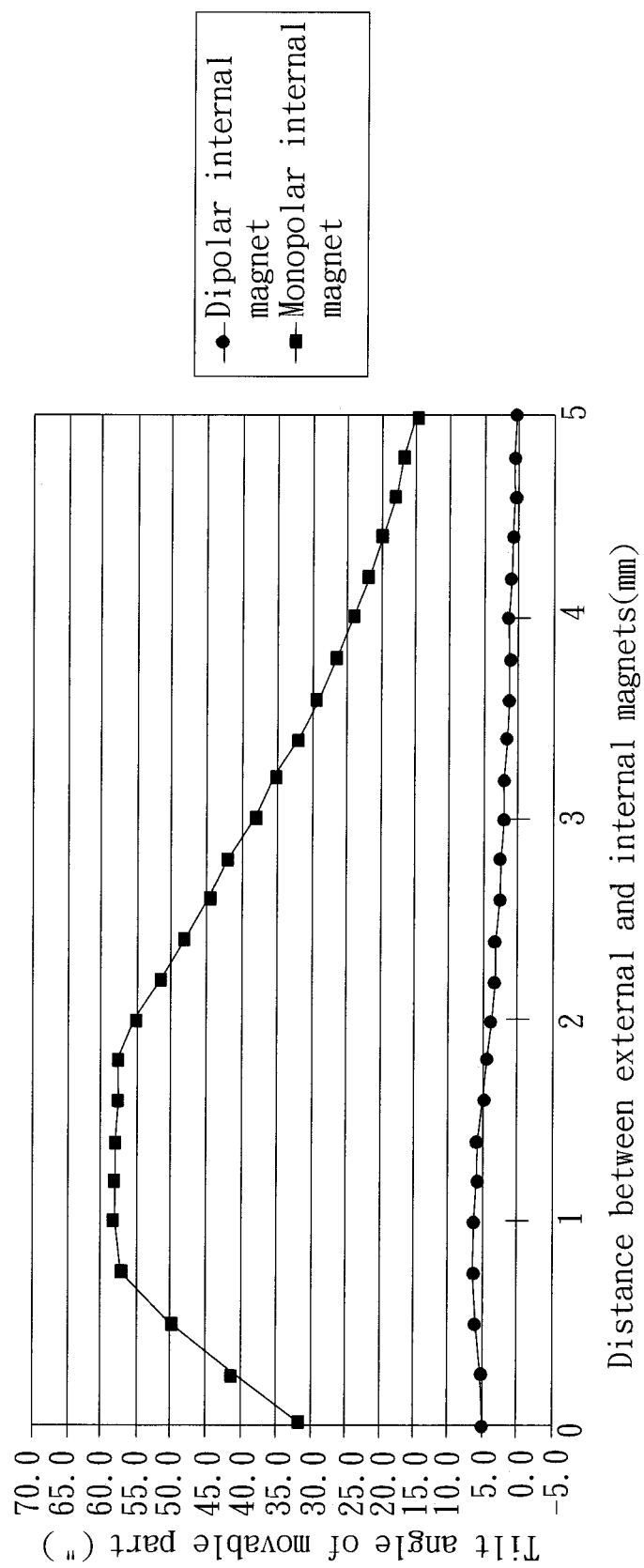
FIG. 10 demonstrates simulation results of relationships between the tilt angle of the movable part and the distance from the external magnet to the internal magnet for the embodiment of FIG. 9.

Refer now to FIG. 9 and FIG. 10; where FIG. 9 shows schematically an arrangement of the driving magnets and the sensor magnet for a third preferred embodiment of the moving-coil closed-loop auto-focusing module with low magnetic interference in accordance with the present invention, and FIG. 10 demonstrates evaluation results of relationships between the tilt angle of the movable part and the distance from the external magnet to the internal magnet for the embodiment of FIG. 9. The difference between this third preferred embodiment of the moving-coil closed-loop auto-focusing module with low magnetic interference and the embodiment of FIG. 4 is that the two pairs of driving magnets 26 in this embodiment are structured to be four corner-type driving magnets 26X located individually and correspondingly at respective corners of the base frame 22.

Due to the spatial consideration, the closer the corner-type driving magnets 26X and the sensor magnet 28 are, the harsher an applicable environment for closed-looping would be. As shown in FIG. 9, a different arrangement of the driving magnets and the sensor magnet is determined ready for testing. The corner-type driving magnets 26X are monopolar, with the same polarity facing the lens module 23 (movable part). The magnetizing direction of the sensor magnet 28 on the lens module 23 (movable part) is parallel to the optical image-capturing direction 91 (Z axis), and the polarity of the driving magnet here for comparing the magnetic interference is set to be monopolar or dipolar.

From FIG. 10, it is found that the magnetic interference upon the monopolar sensor magnet 28 for fulfilling the Z-axial closed-looping is serious. Apparently, the maximal value of the curve for the tilt angle of the lens module 23 is not a saturated value. Since the existence of the motor limits the lens module 23 in tilting, thus the tilt angle shall be compensated by energy transformation through arranging the dipolar sensor magnet 28 so as to reduce the magnetic interference.

Figure 11:
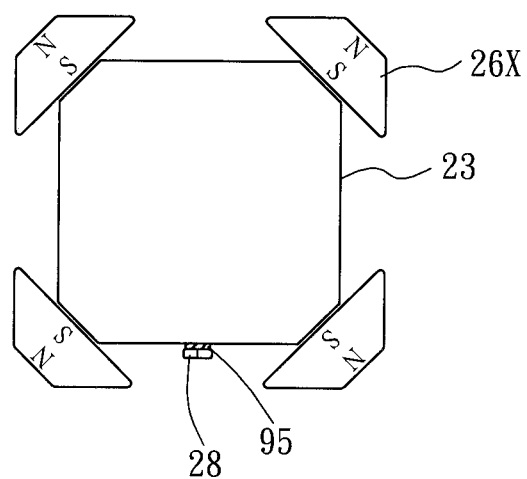
FIG. 11 shows schematically an arrangement of the driving magnets and the sensor magnet for a fourth preferred embodiment of the moving-coil closed-loop auto-focusing module with low magnetic interference in accordance with the present invention.
Figure 12:
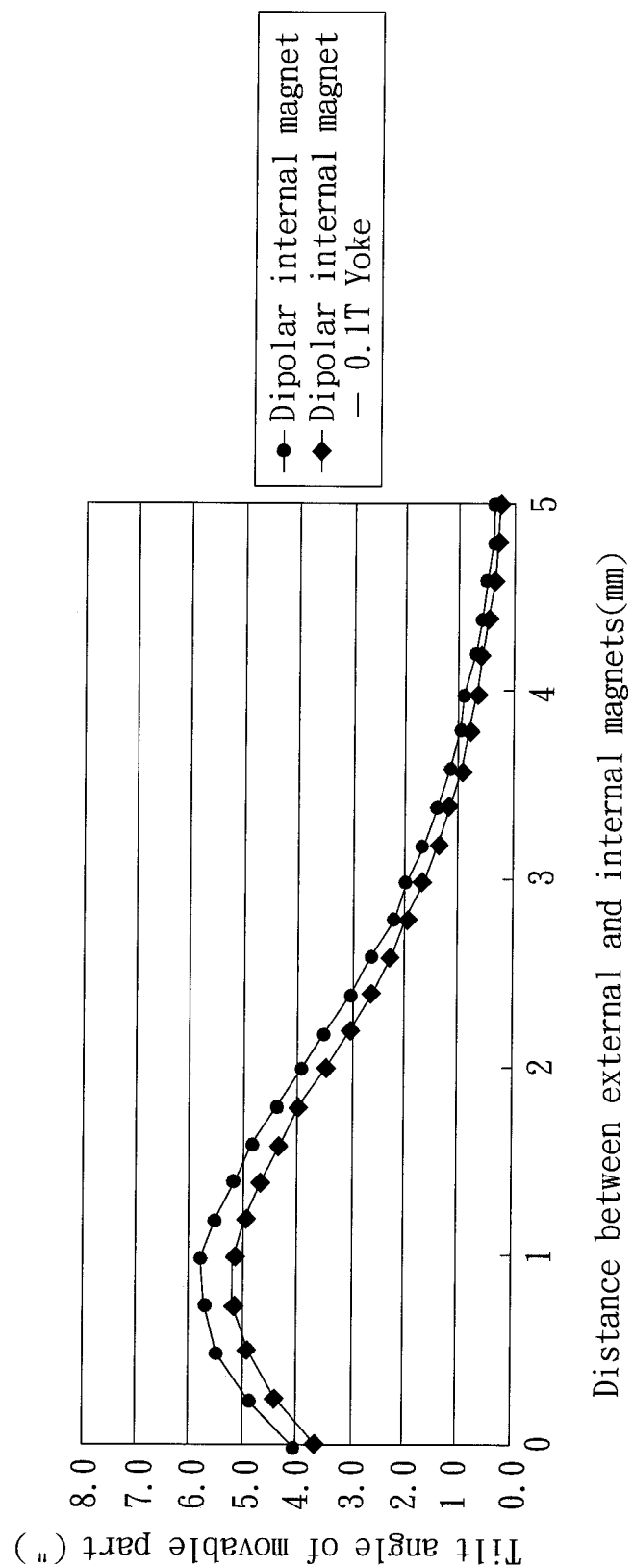
FIG. 12 demonstrates simulation results of relationships between the tilt angle of the movable part and the distance from the external magnet to the internal magnet for the embodiment of FIG. 11.

Refer now to FIG. 11 and FIG. 12; where FIG. 11 shows schematically an arrangement of the driving magnets and the sensor magnet for a fourth preferred embodiment of the moving-coil closed-loop auto-focusing module with low magnetic interference in accordance with the present invention, and FIG. 12 demonstrates evaluation results of relationships between the tilt angle of the movable part and the distance from the external magnet to the internal magnet for the embodiment of FIG. 11. The difference between the fourth preferred embodiment of the moving-coil closed-loop auto-focusing module with low magnetic interference and the third preferred embodiment of FIG. 9 is that this embodiment further includes a yoke 95 introduced to separate the sensor magnet 28 and the lens module 23 (movable part). That is to say, as shown in FIG. 11, by having the yoke 95 to locate adjacent to the dipolar sensor magnet 28, the loss in magnetic flux of the sensor magnet 28 and the corner-type driving magnets 26X would be reduced, and thereby the magnetic interference between the sensor magnet 28 and the corner-type driving magnets 26X can be reduced. As shown in FIG. 12, the introduction of the yoke 95 does reduce the tilt angle of the movable part tilt angle by 10%.

Figure 13:
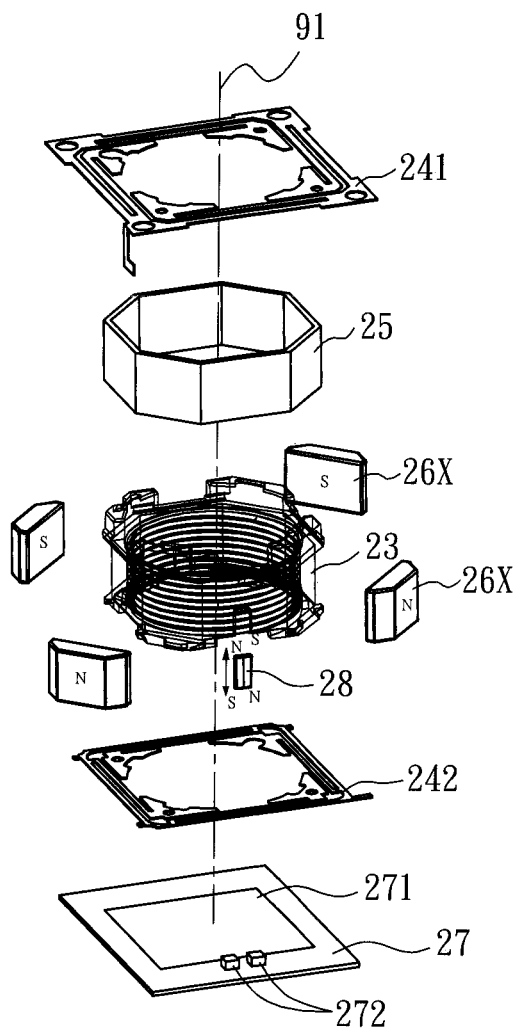
FIG. 13 is a schematic exploded view of the third preferred embodiment of the moving-coil closed-loop auto-focusing module with low magnetic interference in accordance with the present invention.

Referring now to FIG. 13, a schematic exploded view of the third preferred embodiment of the moving-coil closed-loop auto-focusing module with low magnetic interference in accordance with the present invention is shown. The difference between the third preferred embodiment of the moving-coil closed-loop auto-focusing module with low magnetic interference and the embodiment of FIG. 4 is that the two pairs of the driving magnets 26 of FIG. 4 are replaced by four corner-type driving magnets 26X, either monopolar or dipolar. The corner-type driving magnet 26X is monopolar, with the same polarity (N-pole or S-pole) to face inward. The dipolar sensor magnet 28 providing two opposing polarities to different sides thereof can be consisted of two monopolar magnets (one for N-pole and another for S-pole), or a dipolar magnet. Two sensors 272 (Hall sensors) are included in correspondence with two lateral sides of the magnetizing surface of the dipolar sensor magnet 28, and the sensors 272 (Hall sensors) can be built inside a drive IC of the external circuit 27.

Figure 14:
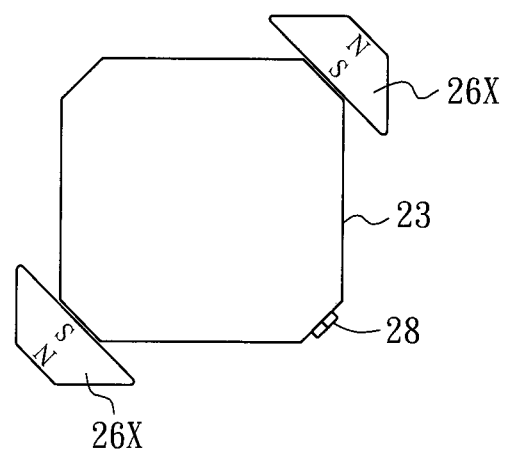
FIG. 14 shows schematically an arrangement of the driving magnets and the sensor magnet for a fifth preferred embodiment of the moving-coil closed-loop auto-focusing module with low magnetic interference in accordance with the present invention.

Referring now to FIG. 14, an arrangement of the driving magnets and the sensor magnet for a fifth preferred embodiment of the moving-coil closed-loop auto-focusing module with low magnetic interference in accordance with the present invention is schematically shown. The difference between the fifth preferred embodiment of the moving-coil closed-loop auto-focusing module with low magnetic interference and the third preferred embodiment of FIG. 9 is that, in this embodiment, the driving magnets 26 are formed as a pair of two corner-type driving magnets 26X, located diagonally to opposing corners of the base frame 22. The sensor magnet 28 can be embodied as at least one dipolar sensor magnet 28, located to a corner of the base frame 22 that does not mount the corner-type driving magnet 26X. Namely, the sensor magnet 28 is positioned at a corner of the lens module 23, by being located between the two corner-type driving magnets 26X.

Figure 15B:
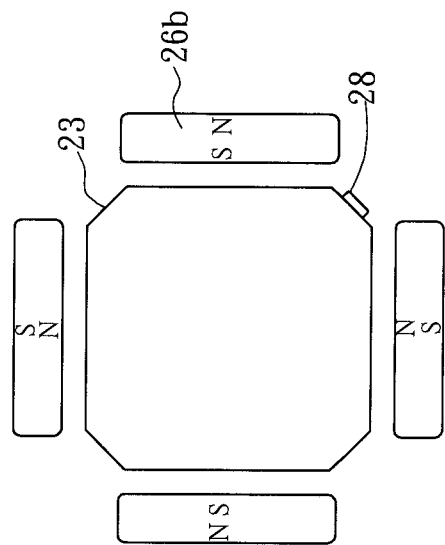
FIG. 15B shows schematically another variation of the arrangement of the driving magnets and the sensor magnet for the sixth preferred embodiment of the moving-coil closed-loop auto-focusing module with low magnetic interference in accordance with the present invention.
Figure 15A:
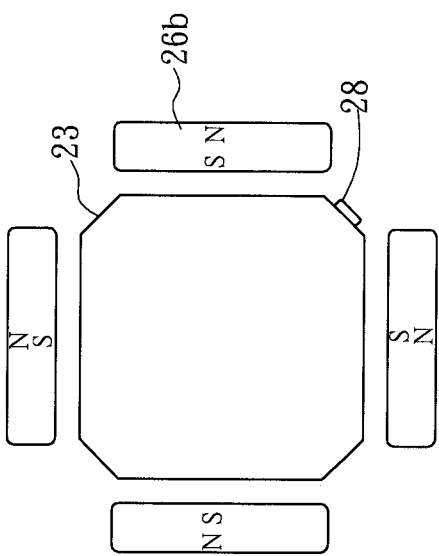
FIG. 15A shows schematically a variation of an arrangement of the driving magnets and the sensor magnet for a sixth preferred embodiment of the moving-coil closed-loop auto-focusing module with low magnetic interference in accordance with the present invention.

Refer now to FIG. 15A and FIG. 15B; where FIG. 15A shows schematically a variation of an arrangement of the driving magnets and the sensor magnet for a sixth preferred embodiment of the moving-coil closed-loop auto-focusing module with low magnetic interference in accordance with the present invention, and FIG. 15B shows schematically another variation of the arrangement of the driving magnets and the sensor magnet for the sixth preferred embodiment of the moving-coil closed-loop auto-focusing module with low magnetic interference in accordance with the present invention. The difference between the sixth preferred embodiment of the moving-coil closed-loop auto-focusing module with low magnetic interference and the fifth preferred embodiment of FIG. 14 is that, in this embodiment, the driving magnets 26 are formed by two pairs, each pair having two driving magnets 26. These two pairs of the driving magnets 26a are distributed evenly to four peripheral sides of the base frame 22, i.e., by surrounding the lens module 23a. As shown in FIG. 15A, in the case that the two pairs of the driving magnets 26a are monopolar, each of the monopolar driving magnets 26a has the same magnetic pole to face the lens module 23, either the S-pole or the N-pole. The dipolar sensor magnet 28 is positioned at an active side of the lens module 23 between two neighboring driving magnets 26a, with the magnetizing direction parallel to the optical direction. In another example, the driving magnet can also be a dipolar driving magnet 26b, with the same polarity facing the same side of the lens module 23. Namely, in the sixth preferred embodiment, the moving-coil closed-loop auto-focusing module with low magnetic interference is a closed-loop embodiment with frame-type driving magnets, derived from the corner-type driving magnets.

The difference between the arrangements (FIG. 15A and FIG. 15B) of the driving magnets and the sensor magnet for the sixth preferred embodiment of the moving-coil closed-loop auto-focusing module with low magnetic interference in accordance with the present invention is that, in FIG. 15B, the two pairs of the driving magnets 26 are the dipolar driving magnets 26b with different polarities on the same side, either N/S-pole or S/N-pole, and the magnetic poles of the dipolar driving magnets 26b to face the lens module 23a are intermittently arranged by the S/N-pole and the N/S-pole. The dipolar sensor magnet 28 is positioned at an active side of the lens module 23 between two neighboring driving magnets 26b, with the magnetizing direction parallel to the optical direction. In this embodiment, the dipolar driving magnet 26b can be symmetrically or asymmetrically magnetized.

Figure 16:
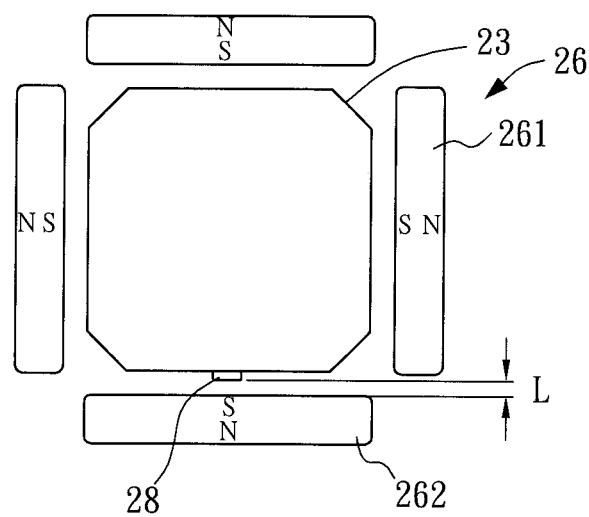
FIG. 16 shows schematically an arrangement of the driving magnets and the sensor magnet for a seventh preferred embodiment of the moving-coil closed-loop auto-focusing module with low magnetic interference in accordance with the present invention.
Figure 17:
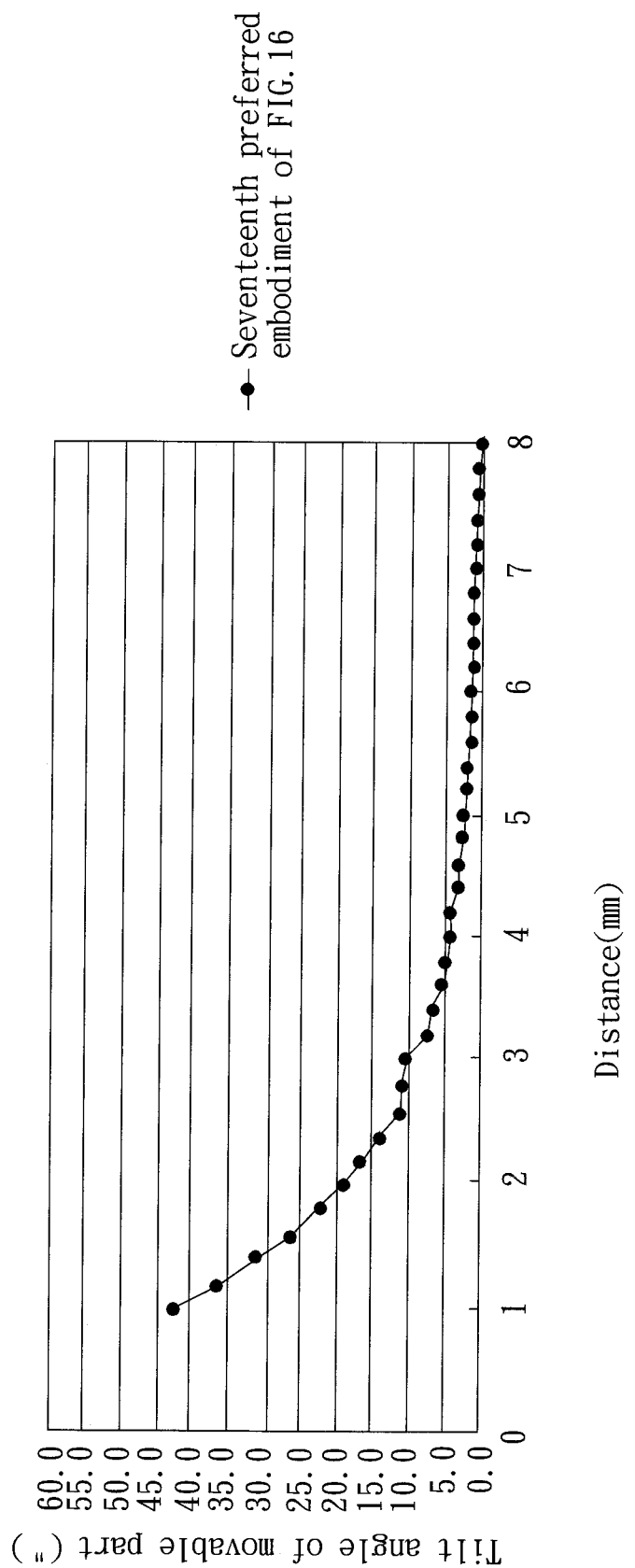
FIG. 17 demonstrates simulation results of relationships between the tilt angle of the movable part and the distance from the external magnet to the internal magnet for the embodiment of FIG. 16.

Refer now to FIG. 16 and FIG. 17; where FIG. 16 shows schematically an arrangement of the driving magnets and the sensor magnet for a seventh preferred embodiment of the moving-coil closed-loop auto-focusing module with low magnetic interference in accordance with the present invention, and FIG. 17 demonstrates evaluation results of relationships between the tilt angle of the movable part and the distance from the external magnet to the internal magnet for the embodiment of FIG. 16. The difference between the seventh preferred embodiment of the moving-coil closed-loop auto-focusing module with low magnetic interference and the sixth preferred embodiment of FIG. 15A is that, in this embodiment, the driving magnets 26 are consisted of a pair of two opposing main driving magnets 261 and a pair of two opposing auxiliary driving magnets 262, and the sensor magnet 28 on the lens module 23 is located to face one of the two auxiliary driving magnets 262. The vertical distance from the sensor magnet 28 (i.e., the internal magnet) to the auxiliary driving magnet 262 (i.e., the external magnet) is a preset distance L.

From FIG. 17, the relationship between the distance (from the frame-type magnet, i.e., the auxiliary driving magnet 262, to the sensor magnet 28 located at the lateral side of the lens module 23) and the tilt angle of the lens module 23 can be understood. Due to limitation upon the spatial distance, the frame-type driving magnet 26 can't fulfill the closed-looping with the sensor magnet 28 directly mounted at the lateral side of the lens module 23. Thus, through the concept of the distance and the magnetic field transformation, one of the driving magnets 26 are divided into two to space the sensor magnet 28 by a spatial distance L.

Figure 18:
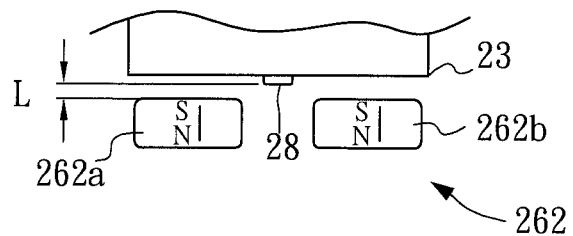
FIG. 18 shows schematically a variation of an arrangement of the driving magnets and the sensor magnet for an eighth preferred embodiment of the moving-coil closed-loop auto-focusing module with low magnetic interference in accordance with the present invention.
Figure 18:
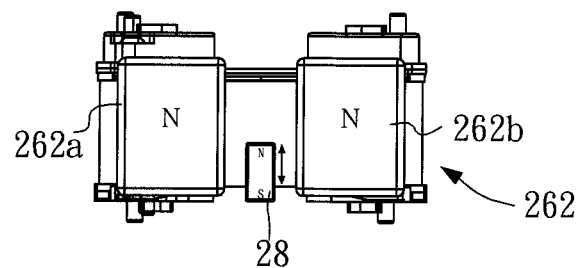
Figure 19:
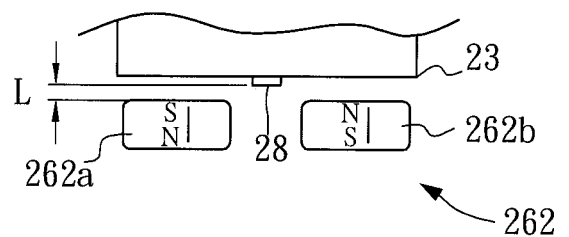
FIG. 19 shows schematically another variation of the arrangement of the driving magnets and the sensor magnet for the eighth preferred embodiment of the moving-coil closed-loop auto-focusing module with low magnetic interference in accordance with the present invention.
Figure 19:
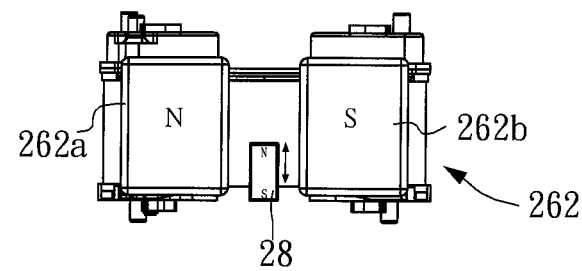
Figure 20:
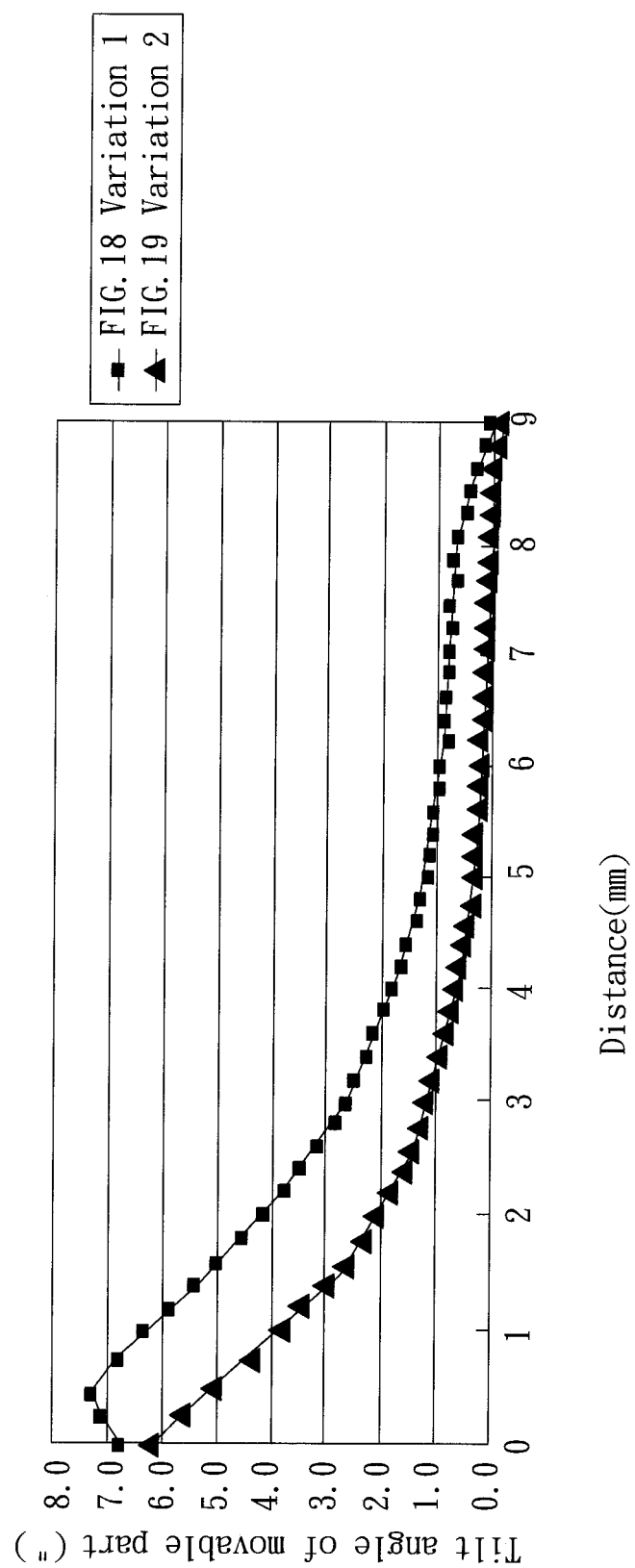
FIG. 20 demonstrates simulation results of relationships between the tilt angle of the movable part and the distance from the external magnet to the internal magnet for the embodiments of FIG. 18 and FIG. 19.

Refer now to FIG. 18, FIG. 19 and FIG. 20; where FIG. 18 shows schematically a variation of an arrangement of the driving magnets and the sensor magnet for an eighth preferred embodiment of the moving-coil closed-loop auto-focusing module with low magnetic interference in accordance with the present invention, FIG. 19 shows schematically another variation of the arrangement of the driving magnets and the sensor magnet for the eighth preferred embodiment of the moving-coil closed-loop auto-focusing module with low magnetic interference in accordance with the present invention, and FIG. 20 demonstrates evaluation results of relationships between the tilt angle of the movable part and the distance from the external magnet to the internal magnet for the embodiments of FIG. 18 and FIG. 19.

As shown in FIG. 18, the difference between the eighth preferred embodiment of the moving-coil closed-loop auto-focusing module with low magnetic interference and the seventh preferred embodiment of FIG. 16 is that, in this embodiment, the sensor magnet 28 is a monopolar sensor, and the respective auxiliary driving magnet 262 is also a monopolar driving magnet but being cut into an auxiliary driving magnet 262a and another auxiliary driving magnet 262b with the same volume. The sensor magnet 28 is located right between the auxiliary driving magnet 262a and the another auxiliary driving magnet 262b. In addition, both the magnetizing surfaces of these two auxiliary driving magnets 262a, 262b face the sensor magnet 28, and the magnetism of these two magnetizing surfaces can be the same N-poles or the same S-poles.

As shown in FIG. 19, the difference between the arrangement here of the driving magnets and the sensor magnet and that of FIG. 18 for the eighth preferred embodiment of the moving-coil closed-loop auto-focusing module with low magnetic interference is that one of these two auxiliary driving magnets 262a, 262b is to have magnetism with reverse N/S-poles. In other words, the inner-side magnetic poles of these two individual auxiliary driving magnets 262a, 262b close to the lens module 23 are opposite to each other.

As shown in FIG. 20, it is confirmed that the driving magnets 26 and the sensor magnet 28 shall be kept by a spatial distance so as to reduce the magnetic interference by the magnetic field N/S transformation. The smaller the vertical distance between these two auxiliary driving magnets 262a, 262b (external magnets) and the sensor magnet 28 (internal magnet) is, the larger the change in the tilt angle of the lens module 23 would be. On the other hand, the larger the vertical distance between the sensor magnet 28 (internal magnet) and these two auxiliary driving magnets 262a, 262b (external magnets) is, the smaller the change in the tilt angle of the lens module 23 would be.

Figure 21:
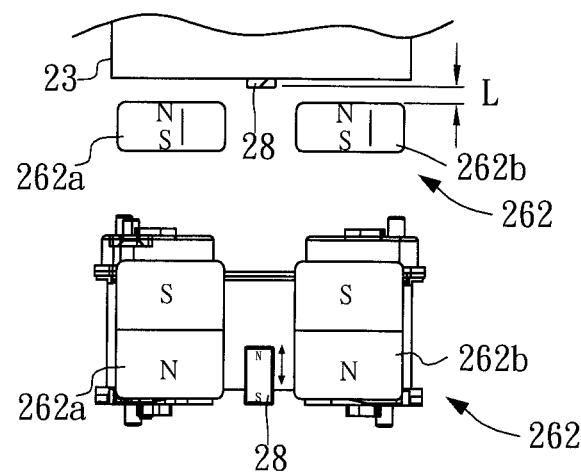
FIG. 21 shows schematically a variation of an arrangement of the driving magnets and the sensor magnet for a ninth preferred embodiment of the moving-coil closed-loop auto-focusing module with low magnetic interference in accordance with the present invention.
Figure 22:
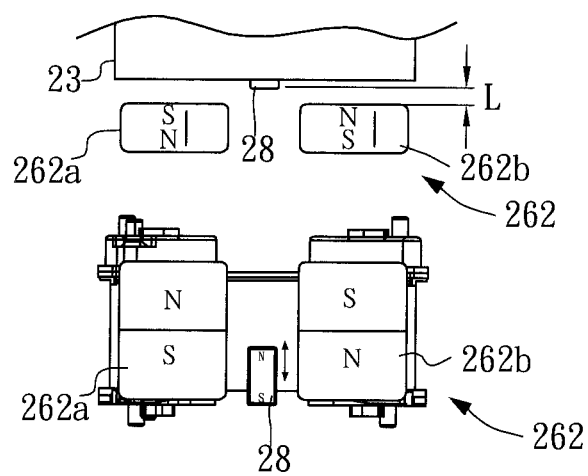
FIG. 22 shows schematically another variation of the arrangement of the driving magnets and the sensor magnet for the ninth preferred embodiment of the moving-coil closed-loop auto-focusing module with low magnetic interference in accordance with the present invention.
Figure 23:
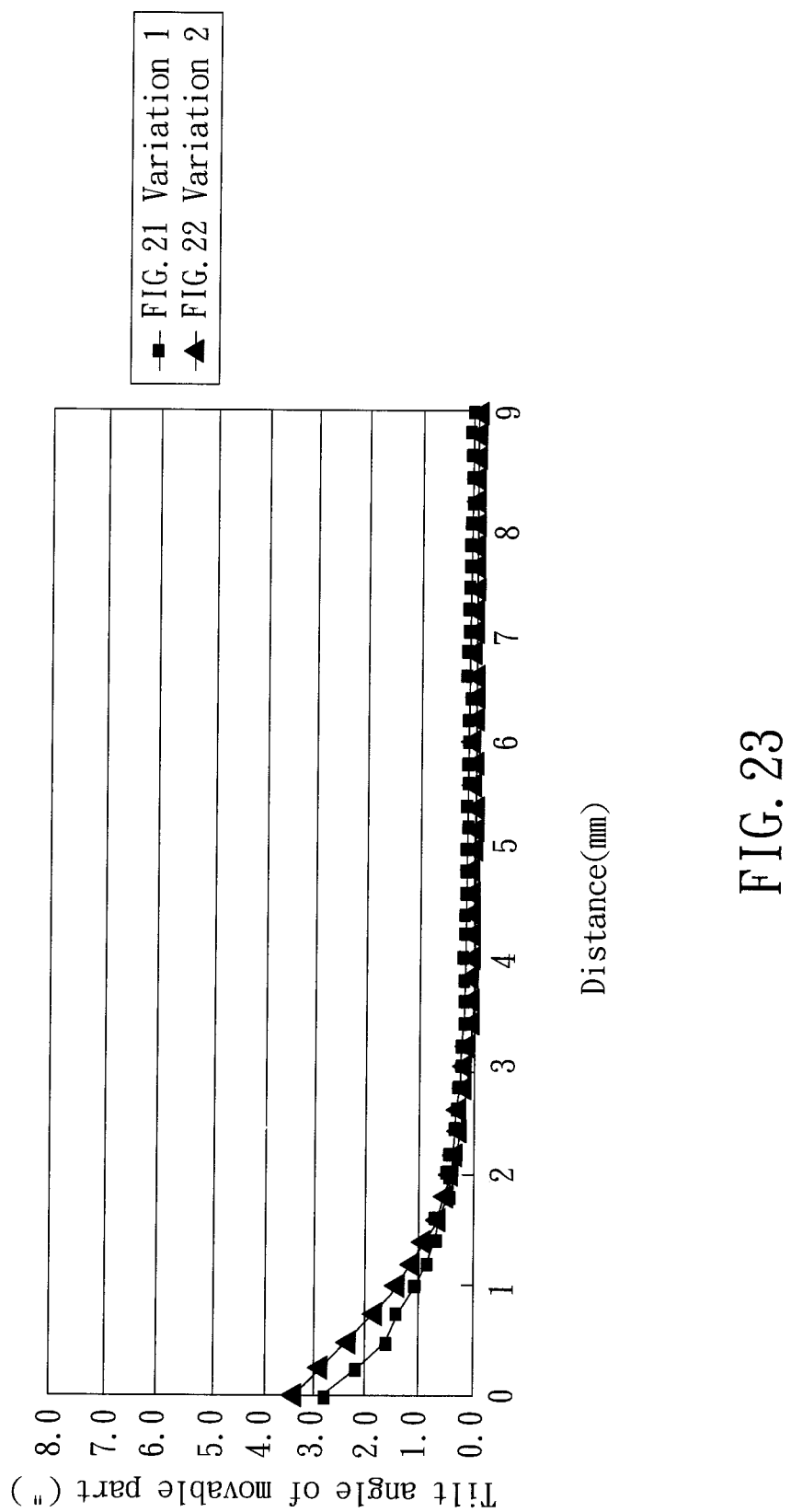
FIG. 23 demonstrates simulation results of relationships between the tilt angle of the movable part and the distance from the external magnet to the internal magnet for the embodiments of FIG. 21 and FIG. 22.

Refer now to FIG. 21, FIG. 22 and FIG. 23; where FIG. 21 shows schematically a variation of an arrangement of the driving magnets and the sensor magnet for a ninth preferred embodiment of the moving-coil closed-loop auto-focusing module with low magnetic interference in accordance with the present invention, FIG. 22 shows schematically another variation of the arrangement of the driving magnets and the sensor magnet for the ninth preferred embodiment of the moving-coil closed-loop auto-focusing module with low magnetic interference in accordance with the present invention, and FIG. 23 demonstrates evaluation results of relationships between the tilt angle of the movable part and the distance from the external magnet to the internal magnet for the embodiments of FIG. 21 and FIG. 22.

As shown in FIG. 21, the difference between the arrangement here of the driving magnets and the sensor magnet for the ninth preferred embodiment of the moving-coil closed-loop auto-focusing module with low magnetic interference and that of FIG. 18 is that the auxiliary driving magnet 262 is a dipolar driving magnet, the N/S polarities for the two auxiliary driving magnets 262a, 262b (external magnet) of the auxiliary driving magnet 262 are the same, and the polarities of the magnetizing surfaces thereof to face the lens module 23 are also the same, either N-pole or S-pole.

As shown in FIG. 22, the difference between the arrangement here of the driving magnets and the sensor magnet for the ninth preferred embodiment of the moving-coil closed-loop auto-focusing module with low magnetic interference and that of FIG. 21 is that the N/S polarities of the two auxiliary driving magnets 262a, 262b (external magnet) are reverse, and the N/S polarities of the magnetizing surfaces thereof to face the lens module 23 are also reverse.

As shown in FIG. 23, the evaluation results further prove the results shown in FIG. 3 for a dipolar design, i.e., that the effect upon the tilt angle is significantly reduced. In other words, with the sensor magnet 28 and the driving magnets 26 to be kept by a distance, by having one or both of the sensor magnet 28 and the driving magnet 26 to be polar, or by having the polarities of the two driving magnets 262a, 262b neighboring the sensor magnet 28 to be reverse, the magnetic interference can be reduced.

Figure 24A:
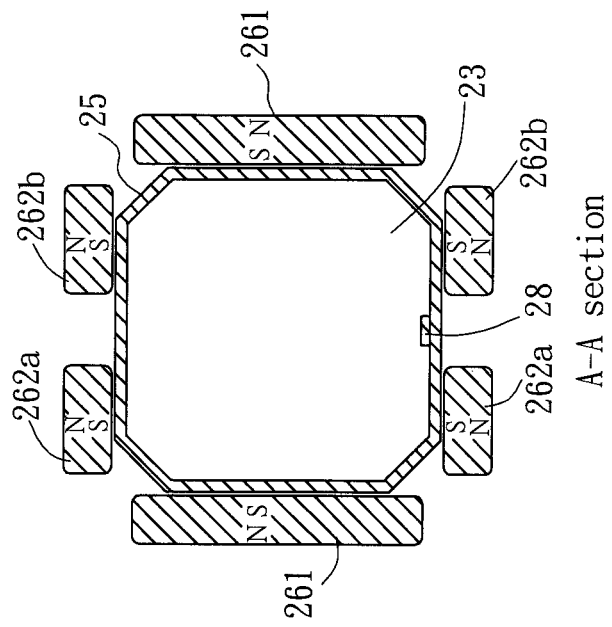
FIG. 24A is a schematic cross-sectional view of FIG. 24 along line A-A.
Figure 24:
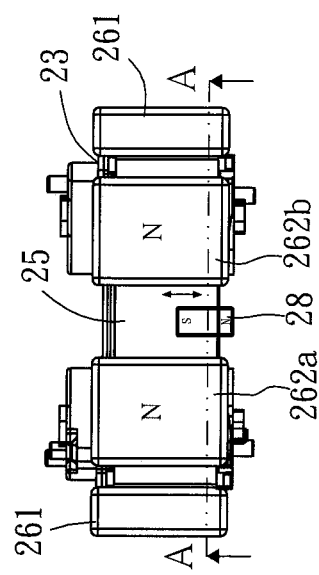
FIG. 24 is a schematic side view of a variation of a tenth preferred embodiment of the moving-coil closed-loop auto-focusing module with low magnetic interference in accordance with the present invention.
Figure 25:
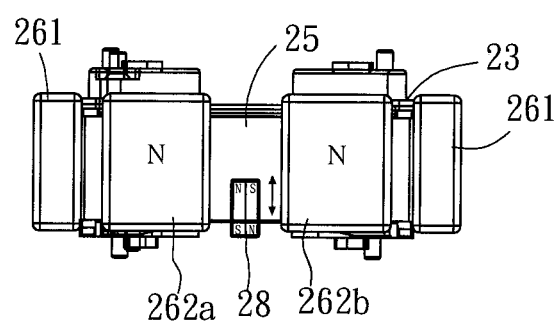
FIG. 25 is a schematic side view of another variation of the tenth preferred embodiment of the moving-coil closed-loop auto-focusing module with low magnetic interference in accordance with the present invention.

Refer now to FIG. 24, FIG. 24A and FIG. 25; where FIG. 24 is a schematic side view of a variation of a tenth preferred embodiment of the moving-coil closed-loop auto-focusing module with low magnetic interference in accordance with the present invention, FIG. 24A is a schematic cross-sectional view of FIG. 24 along line A-A, and FIG. 25 is a schematic side view of another variation of the tenth preferred embodiment of the moving-coil closed-loop auto-focusing module with low magnetic interference in accordance with the present invention.

As shown in FIG. 24 and FIG. 24A, the difference between the tenth preferred embodiment of the moving-coil closed-loop auto-focusing module with low magnetic interference and the seventh preferred embodiment of FIG. 16 is that two identical pairs of two auxiliary driving magnets 262a, 262b are arranged to two opposing sides of the base frame 22, with the magnetism of the magnetizing surfaces of the two pairs of the auxiliary driving magnets 262a, 262b that face the lens module 23 are either the same N-pole or the same S-pole. In addition, the sensor magnet 28 (internal magnet) is a monopolar sensor magnet.

As shown in FIG. 25, the difference between this embodiment and that of FIG. 16 is that, in this embodiment, the sensor magnet 28 (internal magnet) is a dipolar sensor magnet.

Figure 26A:
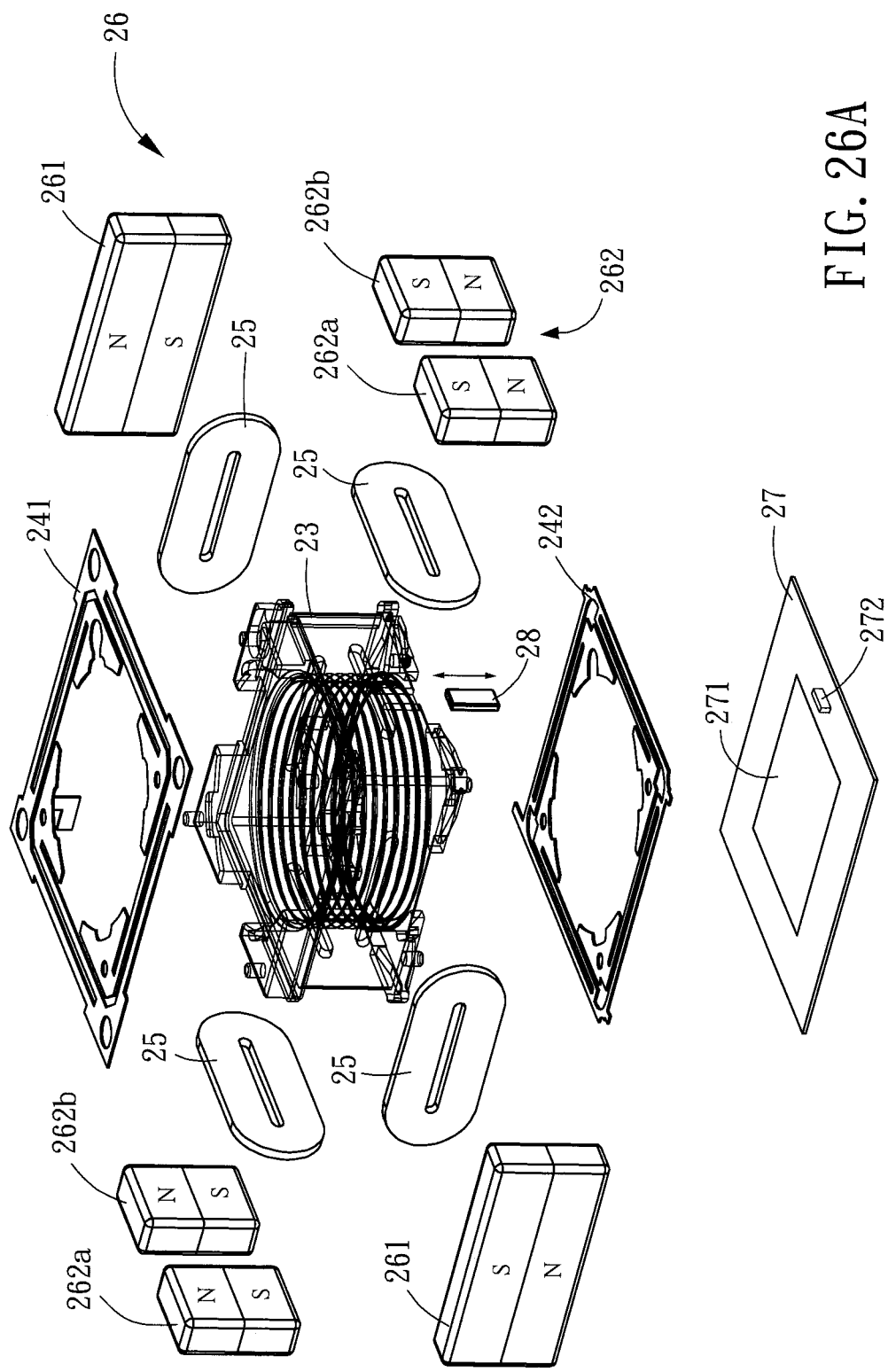
FIG. 26A is a schematic exploded view of a variation of an eleventh preferred embodiment of the moving-coil closed-loop auto-focusing module with low magnetic interference in accordance with the present invention.
Figure 26B:
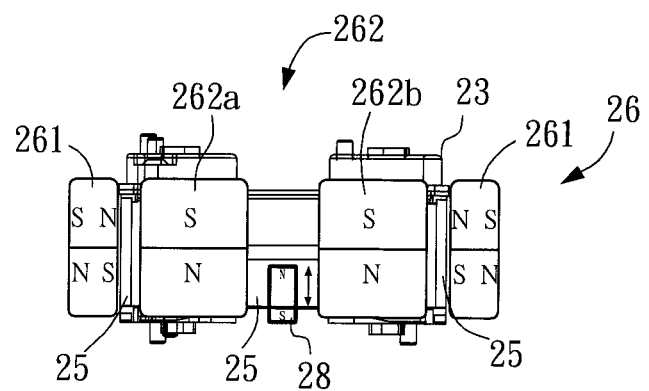
FIG. 26B is a schematic side view of the variation of the eleventh preferred embodiment of the moving-coil closed-loop auto-focusing module with low magnetic interference in accordance with the present invention.
Figure 27:
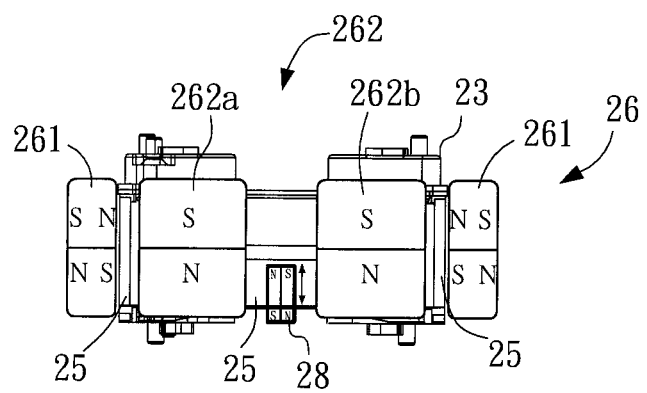
FIG. 27 is a schematic side view of another variation of the eleventh preferred embodiment of the moving-coil closed-loop auto-focusing module with low magnetic interference in accordance with the present invention.

Refer now to FIG. 26A, FIG. 26B and FIG. 27; where FIG. 26A is a schematic exploded view of a variation of an eleventh preferred embodiment of the moving-coil closed-loop auto-focusing module with low magnetic interference in accordance with the present invention, FIG. 26B is a schematic side view of the variation of the eleventh preferred embodiment of the moving-coil closed-loop auto-focusing module with low magnetic interference in accordance with the present invention, and FIG. 27 is a schematic side view of another variation of the eleventh preferred embodiment of the moving-coil closed-loop auto-focusing module with low magnetic interference in accordance with the present invention, As shown in FIG. 26 and FIG. 26A, the difference between the eleventh preferred embodiment of the moving-coil closed-loop auto-focusing module with low magnetic interference and the tenth preferred embodiment of FIG. 24 is that, in this embodiment, the driving magnets 26 are consisted of a pair of two opposing main driving magnets 261 and a pair of two opposing auxiliary driving magnets 262, and each of the two opposing auxiliary driving magnets 262 is cut into halves to produce the two separated auxiliary driving magnets 262a, 262b. The two separated auxiliary driving magnets 262a, 262b are both the dipolar driving magnets, and the sensor magnet 28 is the monopolar driving magnet. In the case that the driving magnets 26 are both the dipolar driving magnets, the polarities thereof are the same. In addition, the coil 25 surrounding the lens module 23 can be one of an annular dipolar coil, a plate-type dipolar coil and a PCB. In this eleventh preferred embodiment, the coil 25 is consisted of two pairs of opposing PCBs located to four sides of the lens module 23, by forming each pair thereof to locate at one pair of opposing sides of the lens module 23.

As shown in FIG. 27, the difference between this embodiment and that of FIG. 26A and FIG. 26B is that the sensor magnet of this embodiment is the dipolar driving magnet. Thus, theoretically, the internal magnet and the external magnet shall be kept by a predetermined distance, and at least one of the internal and external magnets shall be dipolar, such that a closed loop with reduced magnetic interference can be achieved. In other words, if the internal magnet (i.e., the sensor magnet 28) is monopolar, then the external magnets (i.e., the driving magnets 26) must be pairs of dipolar magnets. In the case that the internal magnet (i.e., the sensor magnet 28) is dipolar, then the external magnets (i.e., the driving magnet 26b) would be monopolar, with the same polarity (N or S-pole) to face outward or inward, or the external magnets (i.e., the driving magnets 26) are both dipolar or with different dipolarities.

In summary, the Z-axial closed-loop sensor magnet 28 is positioned at the active side of the driving magnets 26, i.e., a lateral side of the lens carrier 232, and at least one of the driving magnet 26 and the sensor magnet 28 has dipolar magnetism, both thereof have dipolar magnetism, or the driving magnets 26 neighboring the sensor magnet 28 have different polarities, such that the corresponding magnetic interference can be achieved to benefit the Z-axial closed-looping.

Figure 28A:
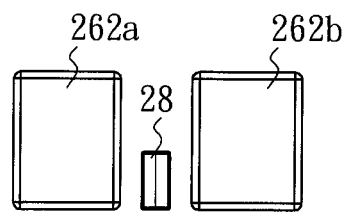
FIG. 28A~FIG. 28C demonstrate individually variations of the arrangement of the two auxiliary driving magnets for the eleventh preferred embodiment of the moving-coil closed-loop auto-focusing module with low magnetic interference in accordance with the present invention.
Figure 28B:
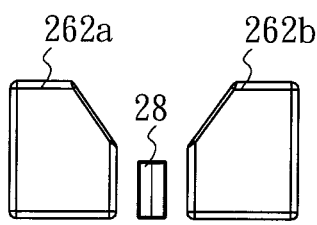
Figure 28C:
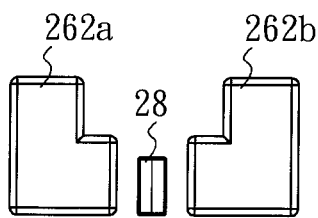

Referring now to FIG. 28A~FIG. 28C, variations of the arrangement of the two auxiliary driving magnets for the eleventh preferred embodiment of the moving-coil closed-loop auto-focusing module with low magnetic interference in accordance with the present invention are demonstrated individually. As shown in FIG. 28A, the two auxiliary driving magnets 262a, 262b are cubic, and have the same size. The sensor magnet 28 is located at a center place between the two auxiliary driving magnets 262a, 262b, in which the sensor magnet 28 is a dipolar sensor magnet. As shown in FIG. 28B, the upper corner of the inner side of each of the two auxiliary driving magnets 262a, 262b that faces the sensor magnet 28 is chopped off. Namely, the cut-out corners of these two auxiliary driving magnets 262a, 262b form two slope surfaces to face each other. As shown in FIG. 28C, more materials are removed from the cut-out corner of each of the two auxiliary driving magnets 262a, 262b than that shown in FIG. 28B. In other words, an upper L-shape corner is formed to each of the two auxiliary driving magnets 262a, 262b at the side thereof facing the sensor magnet 28. Namely, the two L-shape corners face each other to form integrally a square empty space over the sensor magnet 28.

As described above, by removing materials at the sides of the driving magnets 26 (the two auxiliary driving magnets 262a, 262b) close to but above the sensor magnet 28, i.e., by lowering the height of the driving magnet 26 (each of the two auxiliary driving magnets 262a, 262b) at the side facing the sensor magnet 28, then the magnetic field thereof can be controlled within the design scope so as to reduce possible interference upon the magnetic field. Also, by keeping materials of the driving magnets 26 right close to the sensor magnet 28, the induced forcing they provide can thus maintain linearly. Further, due that the driving magnet 26 has a bigger size, thus it is even beneficial for the OIS movement.

Figure 29:
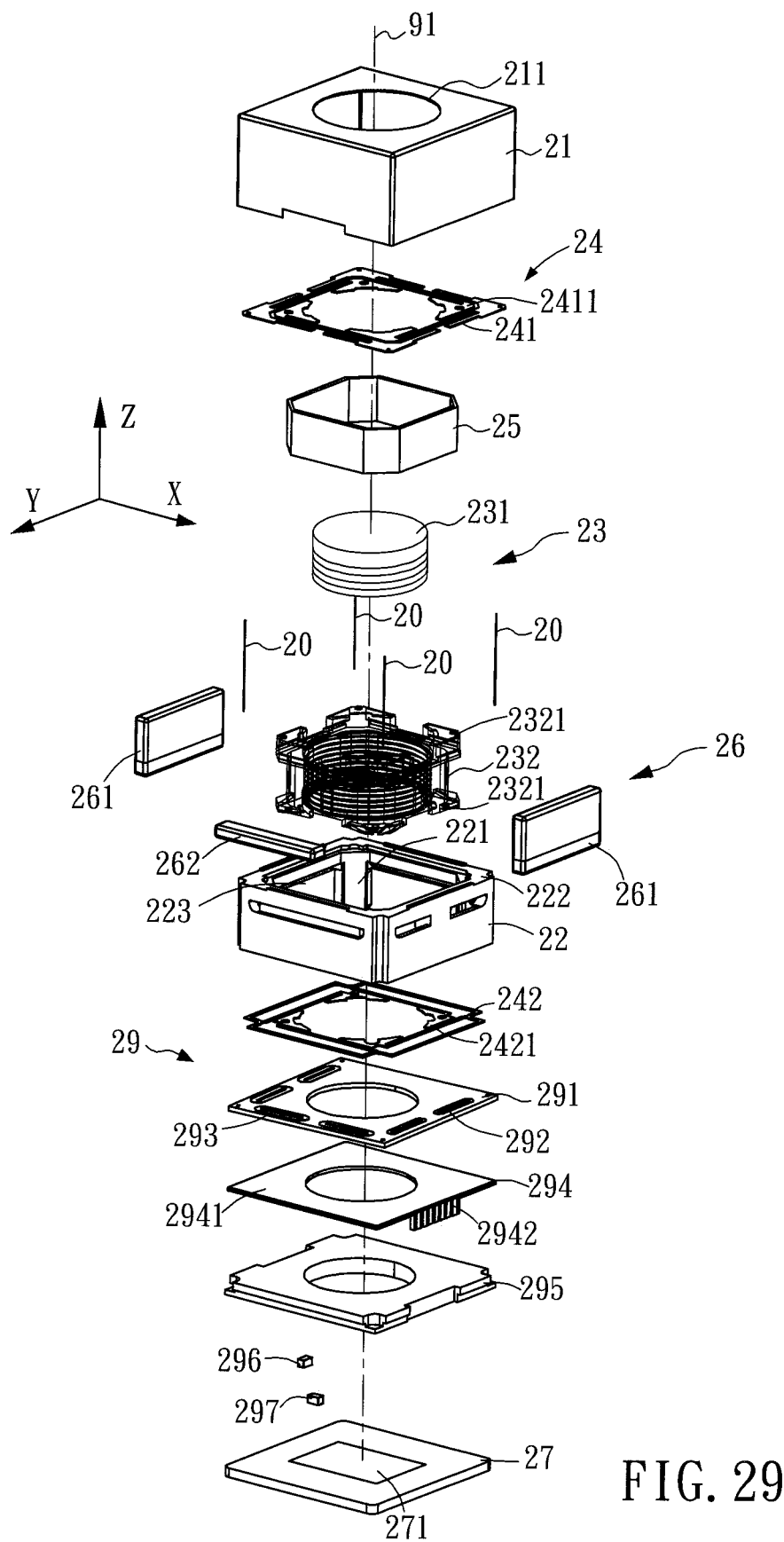
FIG. 29 is a schematic exploded view of a twelfth preferred embodiment of the moving-coil closed-loop auto-focusing module with low magnetic interference in accordance with the present invention.

Referring now to FIG. 29, a schematic exploded view of a twelfth preferred embodiment of the moving-coil closed-loop auto-focusing module with low magnetic interference in accordance with the present invention is shown. The difference between the twelfth preferred embodiment of the moving-coil closed-loop auto-focusing module with low magnetic interference and the embodiment of FIG. 4 is that, in this embodiment, the moving-coil closed-loop auto-focusing module with low magnetic interference as an embodiment with the bi-axial closed-loop OIS further includes a plurality of suspension wires 20, and the second electromagnetic driving module 29. In addition, the driving magnets 26 are consisted of a pair of two opposing main driving magnets 261, and at least one auxiliary driving magnet 262. Further, the two main driving magnets 261 and the auxiliary driving magnet 262 are mounted into three consecutive lateral mounting grooves 223 of the base frame 22, in which the auxiliary driving magnet 262 has a volume (height) smaller than each of the two main driving magnets 261 does. Also, the auxiliary driving magnet 262 is located in the lateral mounting groove 223 of the base frame 22 right between the two main driving magnets 261, and the two main driving magnets 261 are both the dipolar driving magnets. In this embodiment, each of the suspension wires 20 is good for elastic suspension and electric conduction, these suspension wires 20 are together to elastically suspend the assembly of the base frame 22, the lens module 23, the elastic module 24, the coil 25 and the driving magnets 26 right over the second electromagnetic driving module 29. In this embodiment, the plurality of suspension wires 20 can be four strings.

With the plurality of suspension wires 20, the second electromagnetic driving module 29 can be elastically suspended right under the lens module 23 as well as the base frame 22, so that horizontal displacement deviations of the lens module 23 in the X-axial and Y-axial directions can be corrected. The second electromagnetic driving module 29 further includes a circuit board 291, two opposing pairs of two collinear X-axial coils 292, two Y-axial coils 293, a connection plate 294, a base plate 295, an X-axial sensor 296 and a Y-axial sensor 297, in which the two pairs of the two collinear X-axial coils 292 and the two Y-axial coils 293 are neighbored and perpendicular to each other on the circuit board 291. The X-axial sensor 296 is positioned corresponding to a place between two neighboring X-axial coils 292, and the Y-axial sensor 297 is positioned corresponding to another place between the two Y-axial coils 293, while the X-axial sensor 296 and the Y-axial sensor 297 are both mounted on and thus electrically coupled with the external circuit 27. The X-axial sensor 296 and the Y-axial sensor 297 are individually located right under the main driving magnet 261 and the auxiliary driving magnet 262. The circuit board 291 is electrically coupled with the connection plate 294 having a circuit loop 2941. By providing a plurality of metal pins 2942 to corresponding lateral sides of the connection plate 294, the base plate 295 can be then electrically coupled with the external circuit 27.

Figure 30:
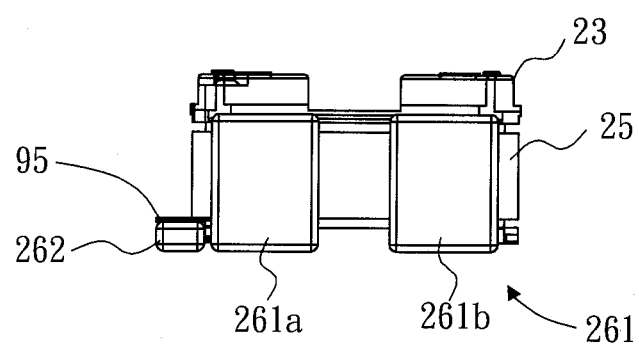
FIG. 30 is a schematic side view of a thirteenth preferred embodiment of the moving-coil closed-loop auto-focusing module with low magnetic interference in accordance with the present invention.

Referring now to FIG. 30, a schematic side view of a thirteenth preferred embodiment of the moving-coil closed-loop auto-focusing module with low magnetic interference in accordance with the present invention is shown. The difference between the thirteenth preferred embodiment of the moving-coil closed-loop auto-focusing module with low magnetic interference and the twelfth preferred embodiment of FIG. 29 is that a yoke 95 is provided to top the auxiliary driving magnet 262 so as to reduce effectively the interference upon the magnetic field among the auxiliary driving magnets 262, the coil 25 and the main driving magnets 261, to minimize magnetic loss, and to stabilize the push forcing. The main driving magnet 261 corresponding to the yoke 95 can be a monopolar driving magnet or a dipolar driving magnet. In this embodiment, each of the two main driving magnets 261 is cut into halves for forming a main driving magnet 261a and another main driving magnet 261b with the same size.

Figure 31:
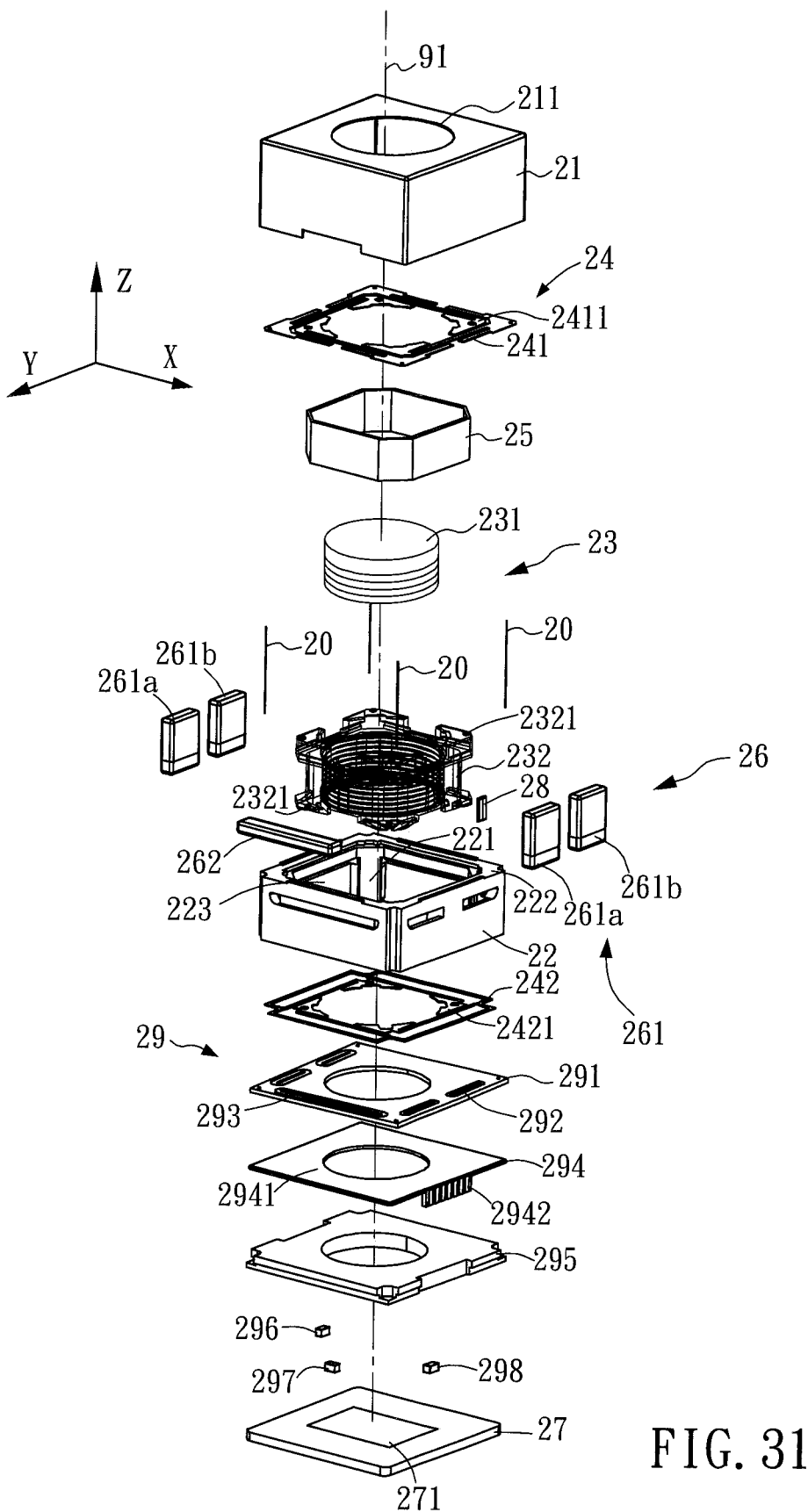
FIG. 31 is a schematic exploded view of a fourteenth preferred embodiment of the moving-coil closed-loop auto-focusing module with low magnetic interference in accordance with the present invention.
Figure 32:
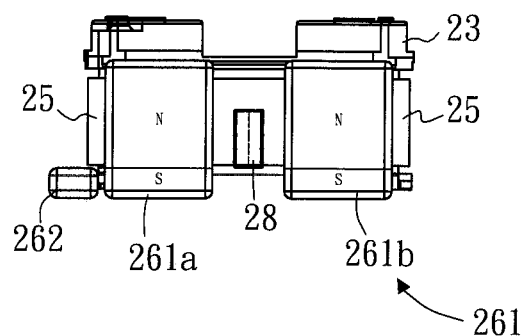
FIG. 32 is a schematic side view of a variation of the fourteenth preferred embodiment of the moving-coil closed-loop auto-focusing module with low magnetic interference in accordance with the present invention.
Figure 33:
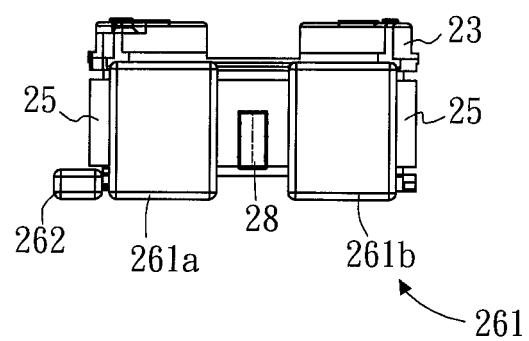
FIG. 33 is a schematic side view of another variation of the fourteenth preferred embodiment of the moving-coil closed-loop auto-focusing module with low magnetic interference in accordance with the present invention.

Refer now to FIG. 31, FIG. 32 and FIG. 33; where FIG. 31 is a schematic exploded view of a fourteenth preferred embodiment of the moving-coil closed-loop auto-focusing module with low magnetic interference in accordance with the present invention, FIG. 32 is a schematic side view of a variation of the fourteenth preferred embodiment of the moving-coil closed-loop auto-focusing module with low magnetic interference in accordance with the present invention, and FIG. 33 is a schematic side view of another variation of the fourteenth preferred embodiment of the moving-coil closed-loop auto-focusing module with low magnetic interference in accordance with the present invention.

By keeping the driving magnets to exist at three consecutive surfaces and to have a gap surface, as the gap surface is wide enough to separate the driving magnets, the corresponding magnetic interference can be reduced. Also, the dipolar sensor magnet 28 is further appropriate to the design of the three-axial closed-loop OIS. As shown in FIG. 31, the difference between the fourteenth preferred embodiment of the moving-coil closed-loop auto-focusing module with low magnetic interference and the thirteenth preferred embodiment of FIG. 30 is that, in this embodiment as a three-axial closed-loop OIS, the moving-coil closed-loop auto-focusing module with low magnetic interference can include at least one dipolar sensor magnet 28 with the magnetizing direction parallel to the optical image-capturing axis 91 or perpendicular to the optical image-capturing axis 91 (the tangential direction). The dipolar sensor magnet 28 is located between the main driving magnet 261a and another main driving magnet 261b with the same size, and on the lens module 28. In addition, the two main driving magnets 261a, 261b are both the dipolar driving magnets, and the second electromagnetic driving module 29 further includes a Z-axial sensor 298 mounted on and thus electrically coupled with the external circuit 27. The Z-axial sensor 298 is located respective to the dipolar sensor magnet 28 so as to detect the movement of the lens module 23 in the Z-axial direction.

As shown in FIG. 32, the difference between the embodiment here and that of FIG. 31 is that the main driving magnet 261a and the another main driving magnet 261b with the same size are both the dipolar driving magnets with the magnetizing directions radially parallel to the optical image-capturing axis 91, and each of the two main driving magnets 261a, 261b can be produced by integrating two magnets with reverse monopolarities. That is to say, a magnetic pole of each of the two main driving magnets 261a, 261b (i.e., the magnetic pole having a height equal to that of the auxiliary driving magnet 262 in FIG. 32) is in charge of a lateral push (in the X-axial or Y-axial direction), while another magnetic pole thereof is in charge of an upward push of the lens module 23.

As shown in FIG. 33, the difference between the embodiment here and that of FIG. 32 is that the main driving magnet 261a and the main driving magnet 261b with the same size are both the monopolar driving magnets with the magnetizing directions radially parallel to the optical image-capturing axis 91. That is to say, the two main driving magnets 261a,

261b provide the lens module 23 an upward push and a lateral push (in the X-axial or Y-axial direction).

Figure 34:
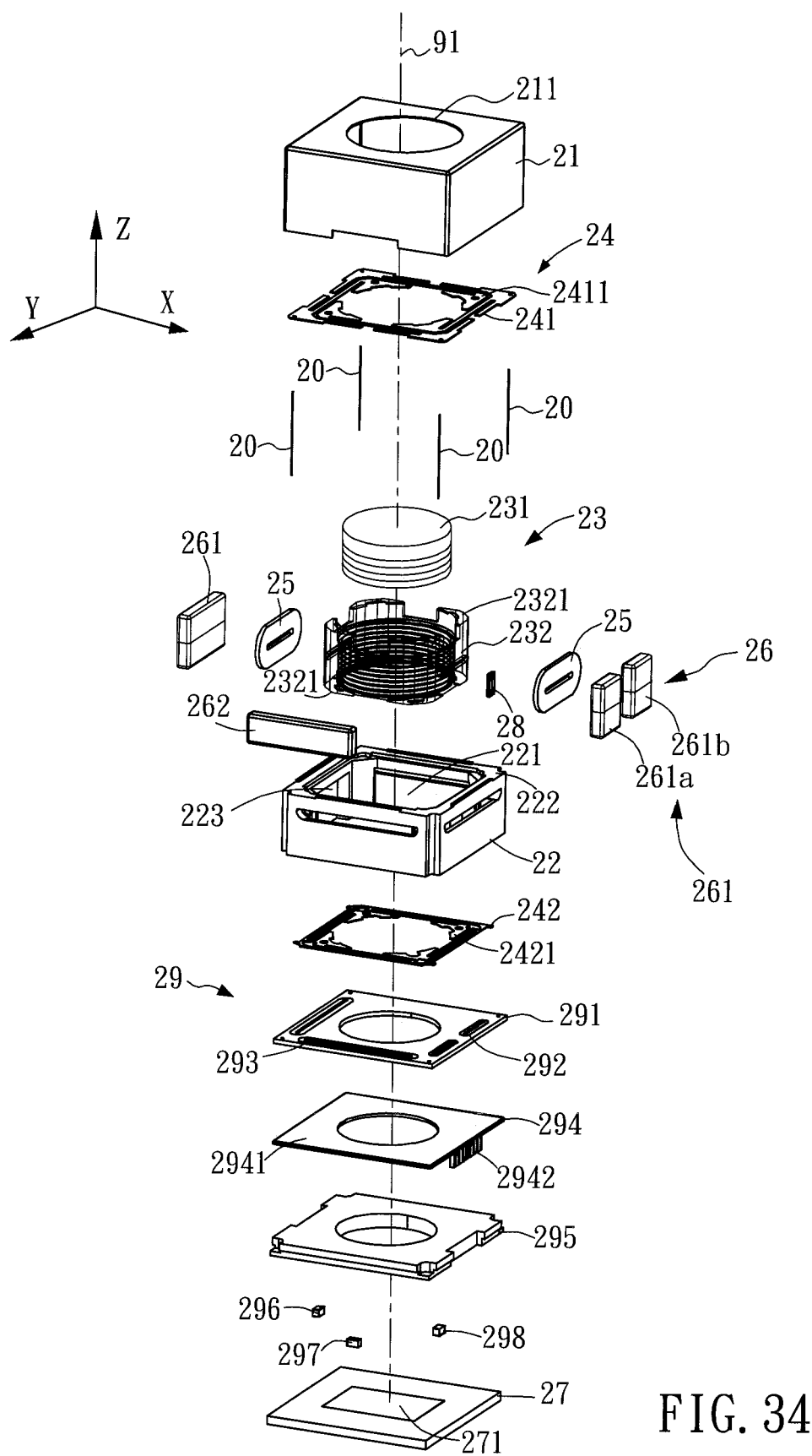
FIG. 34 is a schematic exploded view of a fifteenth preferred embodiment of the moving-coil closed-loop auto-focusing module with low magnetic interference in accordance with the present invention.
Figure 35:
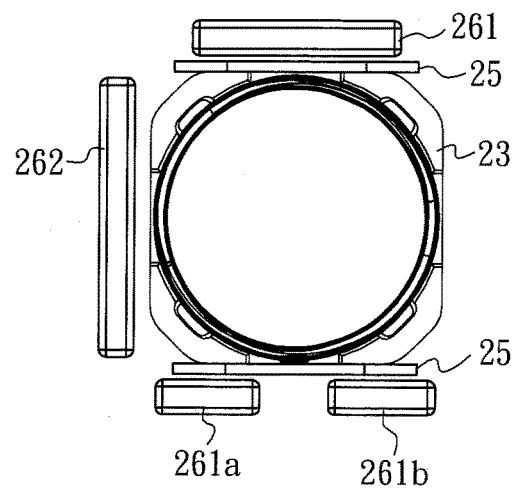
FIG. 35 shows schematically an arrangement of the driving magnet and the coil for the fifteenth preferred embodiment of the moving-coil closed-loop auto-focusing module with low magnetic interference in accordance with the present invention.

Refer now to FIG. 34 and FIG. 35; where FIG. 34 is a schematic exploded view of a fifteenth preferred embodiment of the moving-coil closed-loop auto-focusing module with low magnetic interference in accordance with the present invention, and FIG. 35 shows schematically an arrangement of the driving magnet and the coil for the fifteenth preferred embodiment of the moving-coil closed-loop auto-focusing module with low magnetic interference in accordance with the present invention. In this fifteenth preferred embodiment, the moving-coil closed-loop auto-focusing module with low magnetic interference has the driving magnets to exist at three consecutive surfaces, a gap surface to separate the driving magnets, and the dipolar sensor magnet to be arranged onto the gap surface. The larger the distance between the sensor magnet and the driving magnet is, the less the magnetic interference would be; such that the dual-lens module can be much easier to be structured. In comparison to the embodiment of FIG. 32, the difference of the fifteenth preferred embodiment is that the coil 25 is consisted of two dipolar plate coils or PCB, and the main driving magnet 261 and the two halves of the main driving magnets 261a, 261b are correspondingly located.

Figure 36:
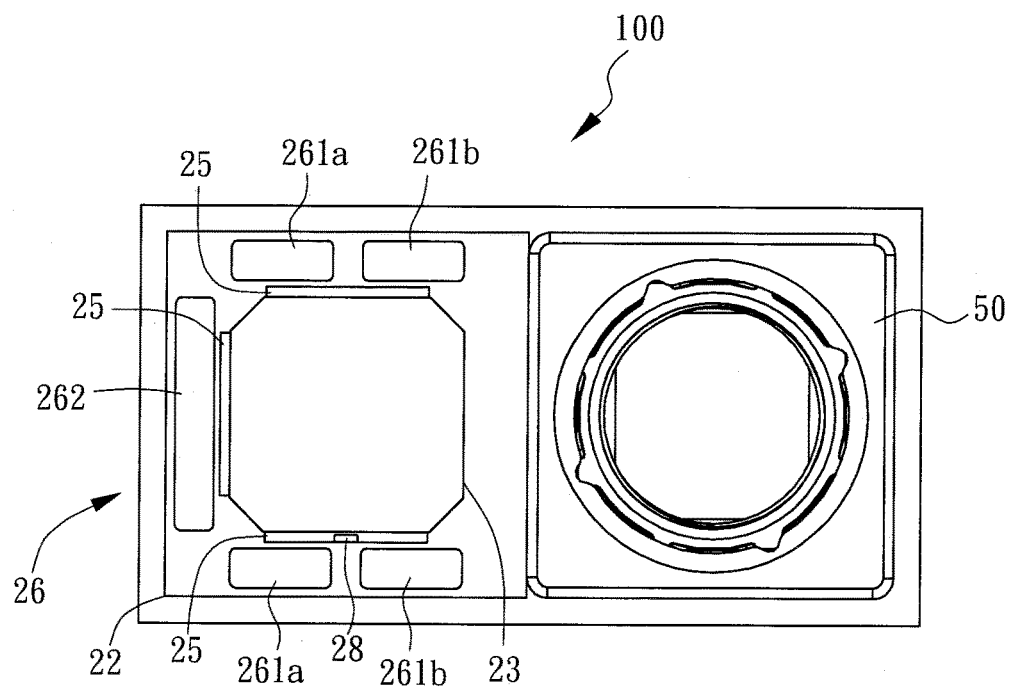
FIG. 36 is a schematic top view of a sixteenth preferred embodiment of the moving-coil closed-loop auto-focusing module with low magnetic interference in accordance with the present invention.
Figure 37:
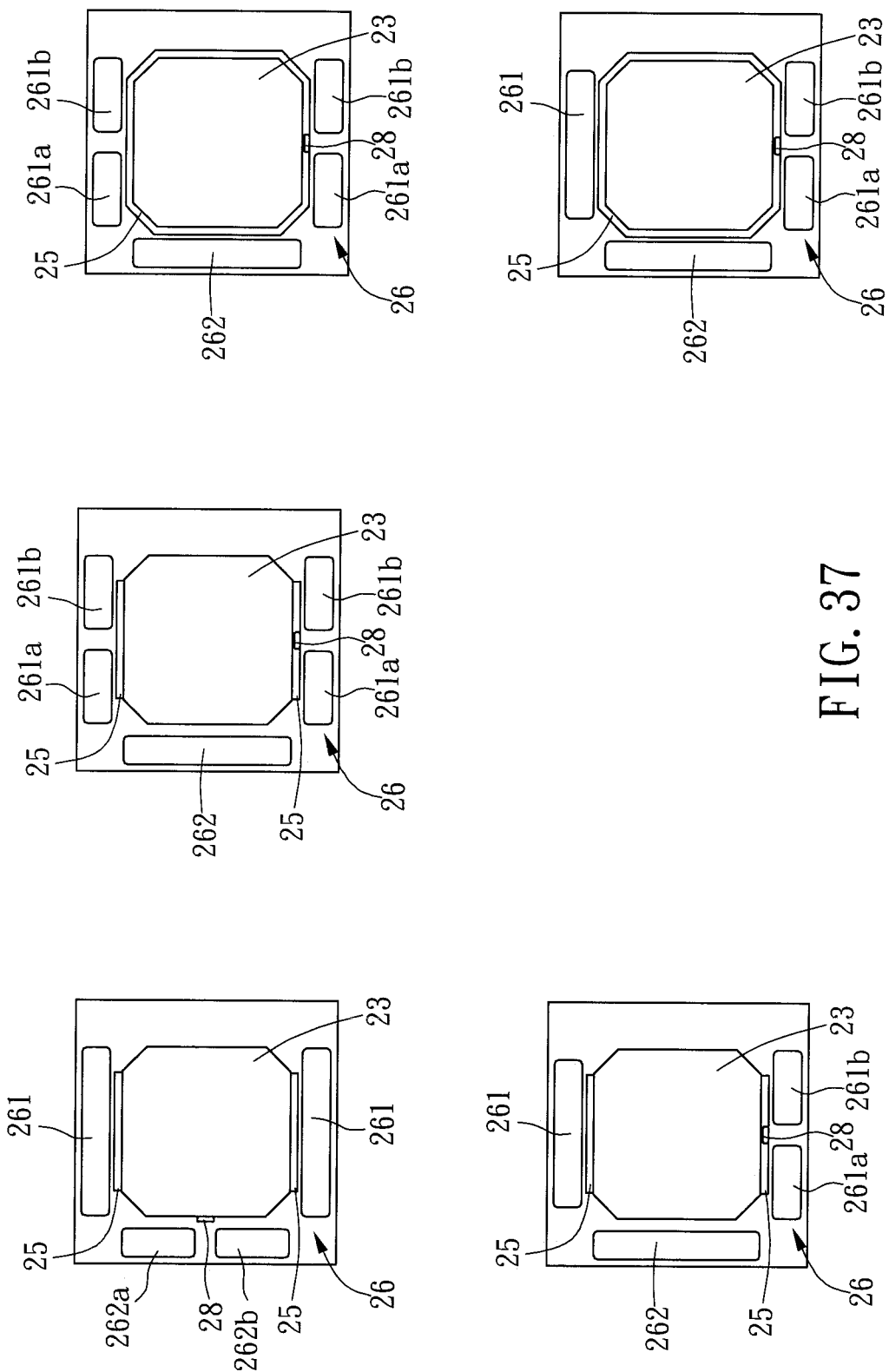
FIG. 37 shows schematically variations of the arrangement of the driving magnet and the coil for the sixteenth preferred embodiment of the moving-coil closed-loop auto-focusing module with low magnetic interference in accordance with the present invention.

In the circumstance of keeping the driving magnets to exist at three consecutive surfaces and to have a gap surface to separate the driving magnets, the gap surface should be made wider so as to provide sufficient spacing to separate the driving magnets. Thereupon, in designing a dual-lens module or a lens module having rooms for accommodating the same structures, the gap surfaces can be arranged to face each other, or an anti-shake motor shall be introduced. Refer now to FIG. 36 and FIG. 37; where FIG. 36 is a schematic top view of a sixteenth preferred embodiment of the moving-coil closed-loop auto-focusing module with low magnetic interference in accordance with the present invention, and FIG. 37 shows schematically variations of the arrangement of the driving magnet and the coil for the sixteenth preferred embodiment of the moving-coil closed-loop auto-focusing module with low magnetic interference in accordance with the present invention. In the sixteenth preferred embodiment of the moving-coil closed-loop auto-focusing module with low magnetic interference shown in FIG. 36, two opposing main driving magnets 261a, 261b and an auxiliary driving magnet 262 are included to fulfill the driving magnets 26 having three consecutive surfaces. Namely, the driving magnets 26 exist at all three connected sides of the base frame 22. Such a design is applicable to a dual-lens module 100 so as to reduce possible interference among magnetic fields. In addition, the another lens module 50 can be an anti-shake motor.

As shown in FIG. 37, various exemplary examples of arrangement of the driving magnets and the coil for the sixteenth preferred embodiment of the moving-coil closed-loop auto-focusing module with low magnetic interference are schematically shown. It is seen that any of the main driving magnets 261 and the auxiliary driving magnets 262 can be cut into halves so as to organize a specific hybrid combination of magnets. Further, the coil 25 to pair the combination can be an annular dipolar coil or a PCB. Thereupon, various examples of arrangement as shown in FIG. 37 can be provided, and all theses examples can be applied to a mono-lens module or a dual-lens module 100.

Figure 38:
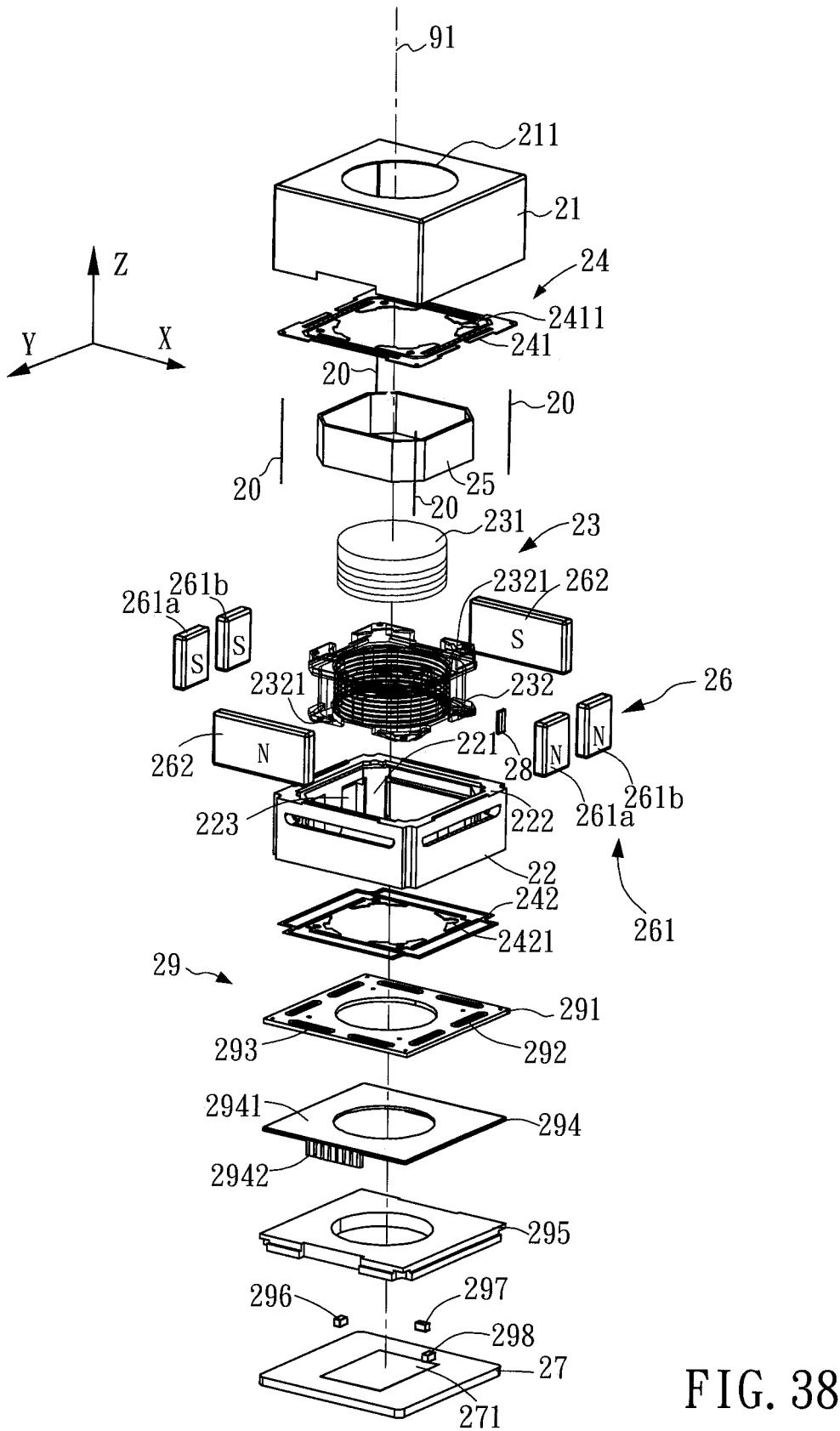
FIG. 38 is a schematic exploded view of a seventeenth preferred embodiment of the moving-coil closed-loop auto-focusing module with low magnetic interference in accordance with the present invention.

Referring now to FIG. 38, a schematic exploded view of a seventeenth preferred embodiment of the moving-coil closed-loop auto-focusing module with low magnetic interference in accordance with the present invention is shown. The difference between this seventeenth preferred embodiment of the moving-coil closed-loop auto-focusing module with low magnetic interference and the fourteenth preferred embodiment of FIG. 31 is that, in this embodiment, two opposing auxiliary driving magnets 262 are included. In addition, both the auxiliary driving magnets 262 are monopolar magnets, with the same polarities. Further, each of the main driving magnets 261 is cut into halves to produce two main driving magnets 261a, 261b with the same size. These two opposing main driving magnets 261a, 261b are both the monopolar magnets.

The second electromagnetic driving module 29 further includes two opposing pairs of two collinear X-axial coils 292 and two opposing pairs of two collinear Y-axial coils 293. The X-axial sensor 296 is located between two X-axial coils 292 in the same pair, while the Y-axial sensor 297 is located between two Y-axial coils 293 in the same pair. The X-axial sensor 296 and the Y-axial sensor 297 are both mounted on and thus electrically coupled with the external circuit 27.

Figure 39:
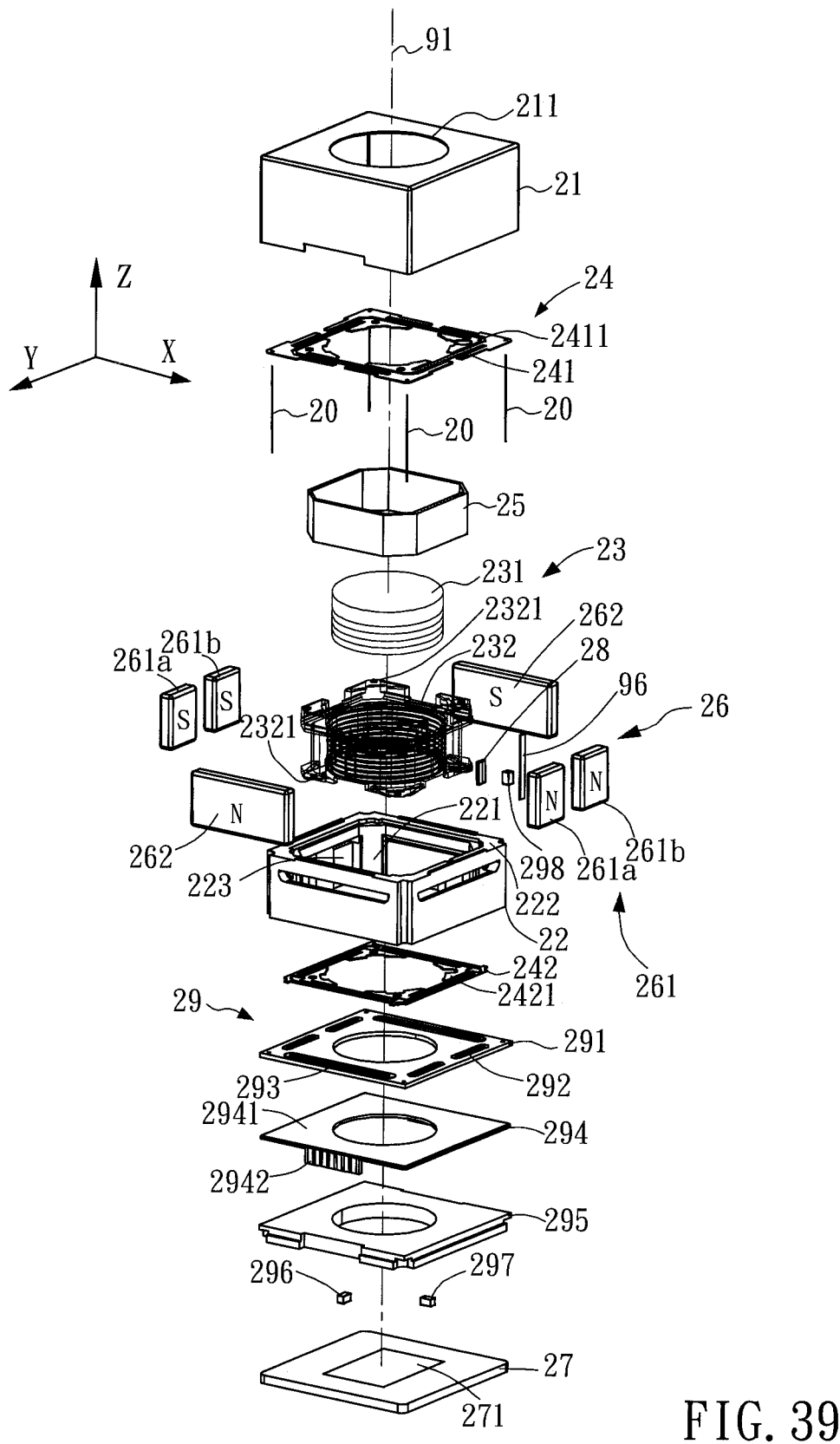
FIG. 39 is a schematic exploded view of an eighteenth preferred embodiment of the moving-coil closed-loop auto-focusing module with low magnetic interference in accordance with the present invention.

Referring now to FIG. 39, a schematic exploded view of an eighteenth preferred embodiment of the moving-coil closed-loop auto-focusing module with low magnetic interference in accordance with the present invention is shown. The difference between the eighteenth preferred embodiment of the moving-coil closed-loop auto-focusing module with low magnetic interference and the seventeenth preferred embodiment of FIG. 38 is that, in this embodiment, the Z-axial sensor 298 (Hall sensor) is positioned aside to the lens module 23 by being mounted at a lateral side of the base frame 22 to oppose the sensor magnet 28. Through an electric-coupled connection plate 96, detection signals of the Z-axial sensor 298 can be transmitted to the external circuit 27. Another difference thereof is that the Y-axial coil 293 of the second electromagnetic driving module 29 is formed as a pair of two opposing coils to be positioned on the circuit board 29.

Figure 40:
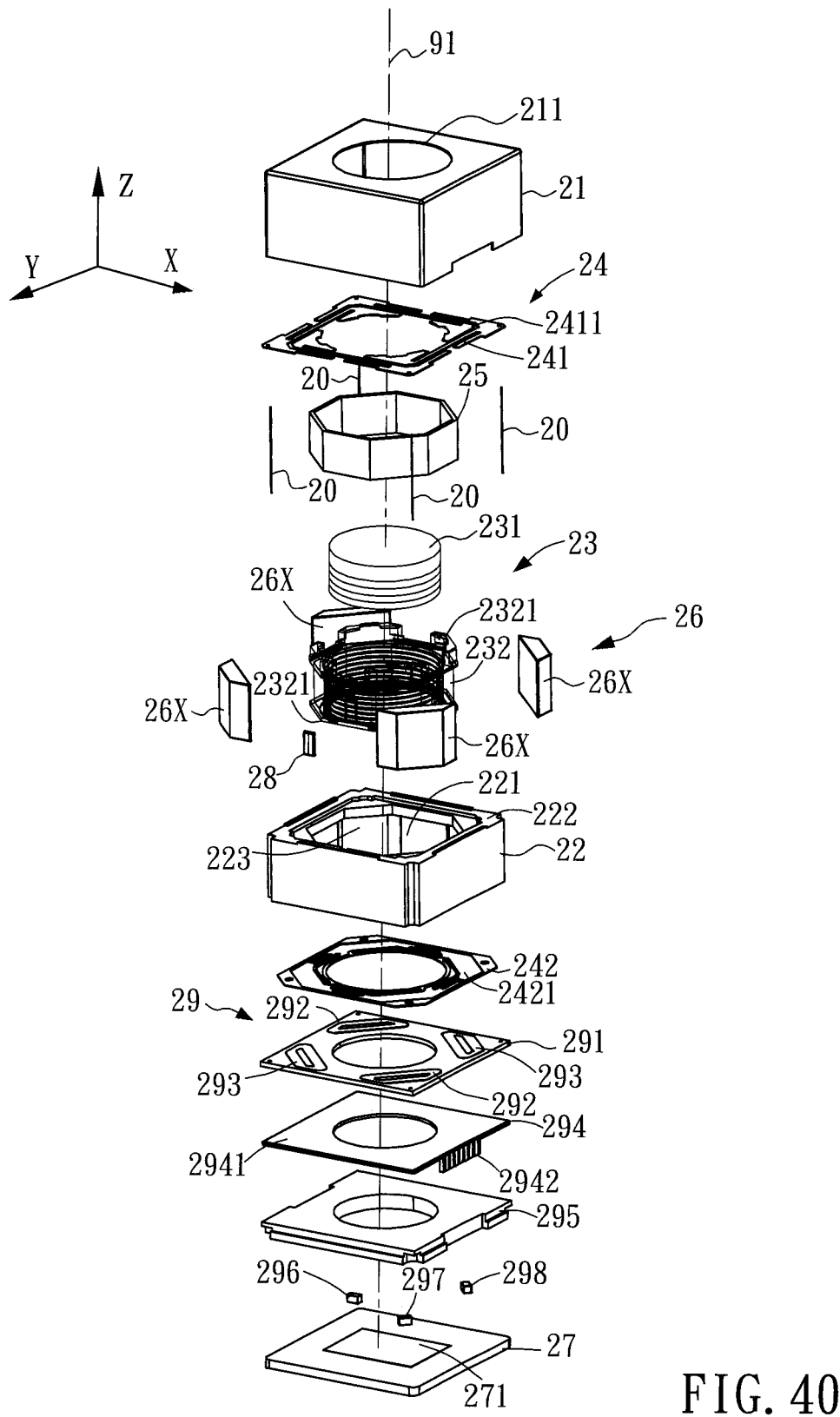
FIG. 40 is a schematic exploded view of a nineteenth preferred embodiment of the moving-coil closed-loop auto-focusing module with low magnetic interference in accordance with the present invention.

Referring now to FIG. 40, a schematic exploded view of a nineteenth preferred embodiment of the moving-coil closed-loop auto-focusing module with low magnetic interference in accordance with the present invention is shown. The difference between the nineteenth preferred embodiment of the moving-coil closed-loop auto-focusing module with low magnetic interference and the seventeenth preferred embodiment of FIG. 38 is that, in this embodiment, the driving magnets 26 are consisted of two pairs of two corner-type driving magnets 26X, located individually at four corresponding corners of the base frame 22. Another difference thereof is that the second electromagnetic driving module 29 includes two diagonal-opposing X-axial coils 292 and two diagonal-opposing Y-axial coils 293, located individually at four corresponding corners of the circuit board 291.

Figure 41A:
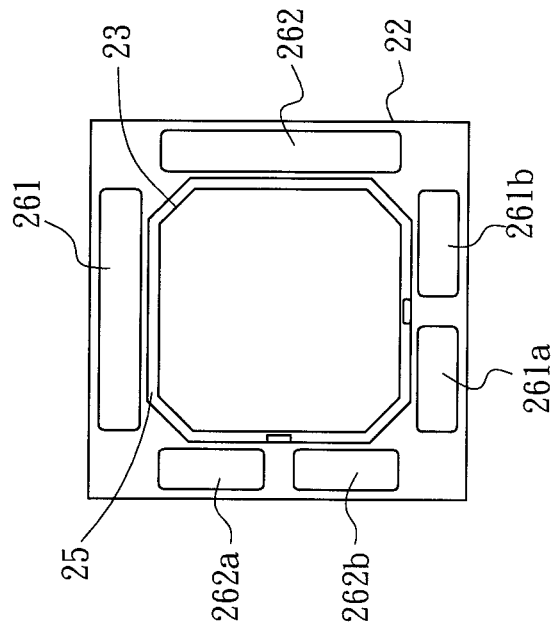
FIG. 41A is a schematic cross-sectional view of a variation of a twentieth preferred embodiment of the moving-coil closed-loop auto-focusing module with low magnetic interference in accordance with the present invention.
Figure 41B:
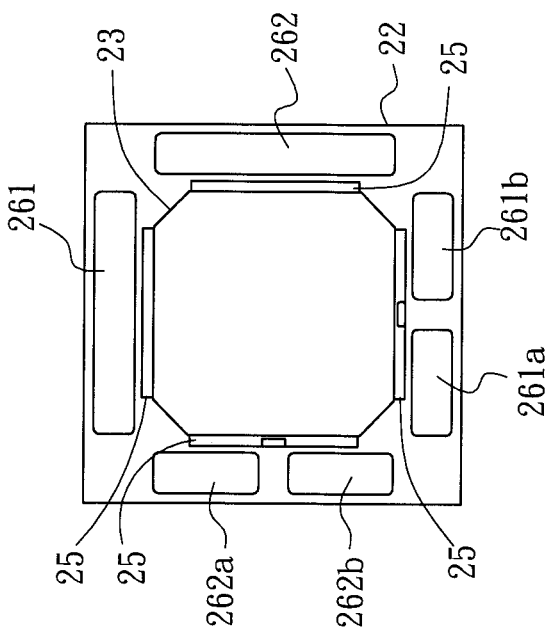
FIG. 41B is a schematic cross-sectional view of another variation of the twentieth preferred embodiment of the moving-coil closed-loop auto-focusing module with low magnetic interference in accordance with the present invention.

Refer now to FIG. 41A and FIG. 41B; where FIG. 41A is a schematic cross-sectional view of a variation of a twentieth preferred embodiment of the moving-coil closed-loop auto-focusing module with low magnetic interference in accordance with the present invention, and FIG. 41B is a schematic cross-sectional view of another variation of the twentieth preferred embodiment of the moving-coil closed-loop auto-focusing module with low magnetic interference in accordance with the present invention.

As shown in FIG. 41A, one of the two main driving magnets 261 is cut into halves so as to produce two main driving magnets 261a, 261b with the same size to be located on the base frame 22. In addition, one of the two auxiliary driving magnets 262 is cut into halves so as to produce two auxiliary driving magnets 262a, 262b with the same size to be located on the base frame 22. The two main driving magnets 261a, 261b and the two auxiliary driving magnets 262a, 262b are neighbored and perpendicular to each other, and also opposed to the coil 25 that surrounds the lens module 23, in which the coil 25 is a plate-type dipolar coil.

As shown in FIG. 41B, the difference between this twentieth preferred embodiment of the moving-coil closed-loop auto-focusing module with low magnetic interference and that of FIG. 41B is that, in this embodiment, the coil 25 is an annular coil.

Figure 42C:
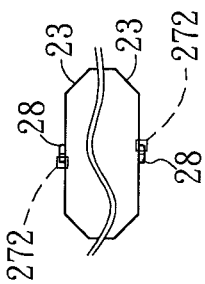
FIG. 42A~FIG. 42D demonstrate schematically variations of the arrangement of the dipolar sensor magnet and the sensor (Hall sensor) for the moving-coil closed-loop auto-focusing module with low magnetic interference in accordance with the present invention.
Figure 42D:
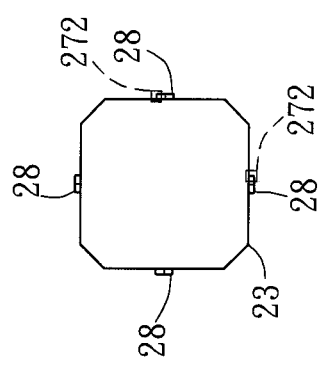
Figure 42A:
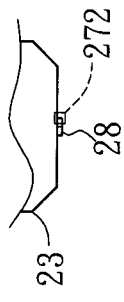
Figure 42B:
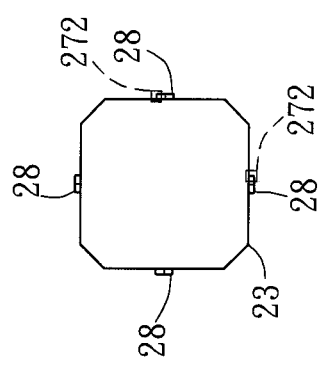

Referring now to FIG. 42A~FIG. 42D, variations of the arrangement of the dipolar sensor magnet and the sensor (Hall sensor) for the moving-coil closed-loop auto-focusing module with low magnetic interference in accordance with the present invention are schematically demonstrated, in all of which the magnetizing direction of the dipolar sensor magnet 28 is the optical direction. In FIG. 42A, a basic structure is shown to have a sensor magnet 28 and a sensor 272 (Hall sensor). In FIG. 42B, a sensor magnet 28 and two sensors 272 (Hall sensors) are included, where the two sensors 272 (Hall sensors) are furnished to opposing sides thereof under the sensor magnet 28 and kept separate by a preset distance. The two sensors 272 are to detect individually the N/S magnetic field so as to obtain a tilt value. In FIG. 42C, two diagonal-opposing sensor magnets 28 and two diagonal-opposing sensors 272 (Hall sensors) are included, by being mounted individually to four corners of the lens module 23, so as to detect individually the N/S magnetic field for obtaining a tilt value. In FIG. 42D, a plurality of sensor magnets 28 and two sensors 272 (Hall sensors) are included, where the two sensors 272 (Hall sensors) are furnished to two neighboring sides of the lens module 23 so as to correspond to the adjacent sensor magnets 28, such that the N/S magnetic field can be detected to calibrate the position of the lens module 23.

Figure 43:
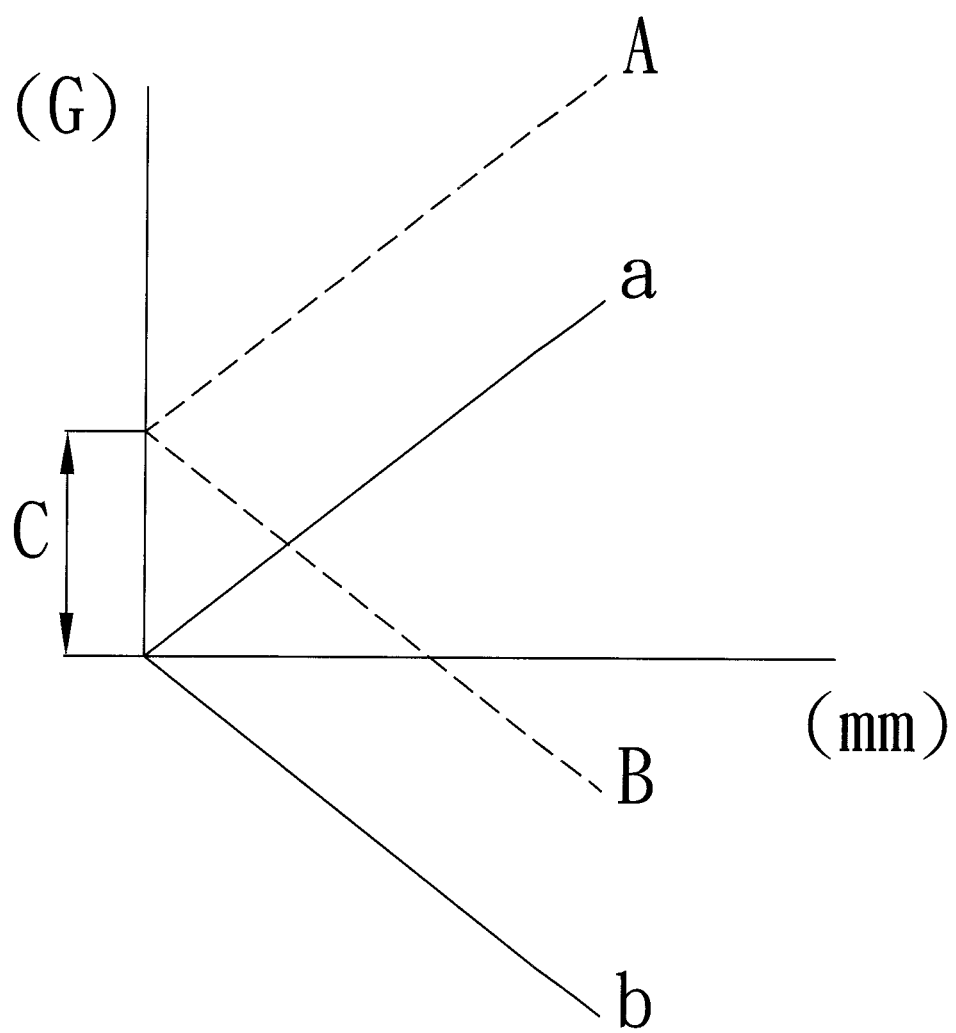
FIG. 43 demonstrates schematically the relationship between the magnetic field and the interference of the moving-coil closed-loop auto-focusing module with low magnetic interference in accordance with the present invention.

Referring to FIG. 43, the relationship between the magnetic field and the interference of the moving-coil closed-loop auto-focusing module with low magnetic interference in accordance with the present invention are demonstrated schematically. Two sensors 272 (Hall sensors) are applied to detect magnitudes of the N/S magnetic field. The N/S magnetic field can be provided by one dipolar sensor magnet 28 or two dipolar sensor magnets 28 on the same axis. Provided that the detected magnitudes of the magnetic field are a(+) and b(+) and the external magnetic interference is set to be a constant C, then two magnitudes of the magnetic field would be A=a+C, and B=b+C, including the magnetic interference. By applying the N/S magnetic field to erase the magnetic interference C, then A−B=a−b; i.e., A=a and B=b.

Figure 44A:
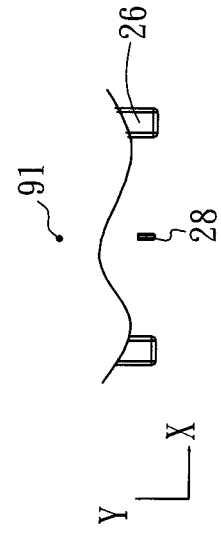
FIG. 44A~FIG. 44D demonstrate schematically variations of the mounting of the dipolar sensor magnet in the moving-coil closed-loop auto-focusing module with low magnetic interference of the present invention.
Figure 44C:
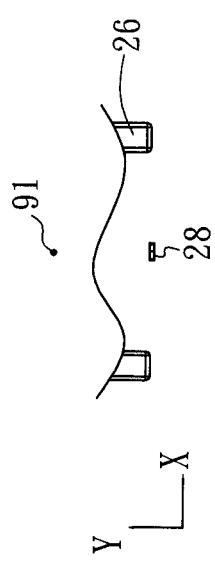
Figure 44B:
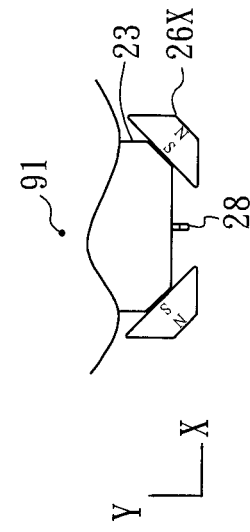
Figure 44D:
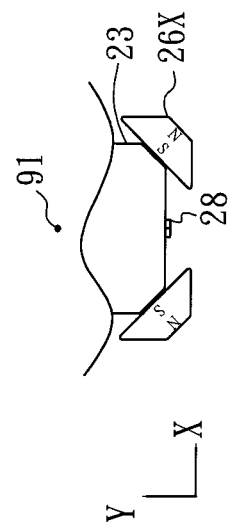

Referring now to FIG. 44A~FIG. 44D, variations of the mounting of the dipolar sensor magnet in the moving-coil closed-loop auto-focusing module with low magnetic interference of the present invention are demonstrated schematically. As shown in FIG. 44A and FIG. 44C, the magnetizing surface of the dipolar sensor magnet 28 is parallel to the optical image-capturing axis 91, and further parallel to the X axis for mounting. As shown in FIG. 44B and FIG. 44D, the magnetizing surface of the dipolar sensor magnet 28 is parallel to the optical image-capturing axis 91, and further parallel to the Y axis for mounting.

Figure 45B:
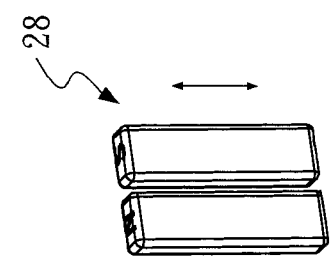
FIG. 45B is a schematic perspective view of another variation of the dipolar sensor magnet of the moving-coil closed-loop auto-focusing module with low magnetic interference in accordance with the present invention.
Figure 45A:
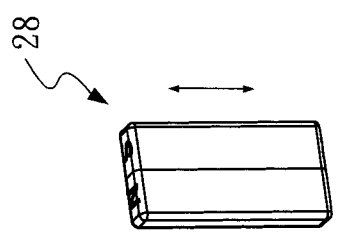
FIG. 45A is a schematic perspective view of a variation of the dipolar sensor magnet of the moving-coil closed-loop auto-focusing module with low magnetic interference in accordance with the present invention.

Refer now to FIG. 45A and FIG. 45B; where FIG. 45A is a schematic perspective view of a variation of the dipolar sensor magnet of the moving-coil closed-loop auto-focusing module with low magnetic interference in accordance with the present invention, and FIG. 45B is a schematic perspective view of another variation of the dipolar sensor magnet of the moving-coil closed-loop auto-focusing module with low magnetic interference in accordance with the present invention. As shown in FIG. 45A, the two dipolar sensor magnets 28 can be built integrally as a unique piece. As shown in FIG. 45B, the sensor magnets 28 are two monopolar magnets, with reverse N/S magnetic poles.

Figure 46:
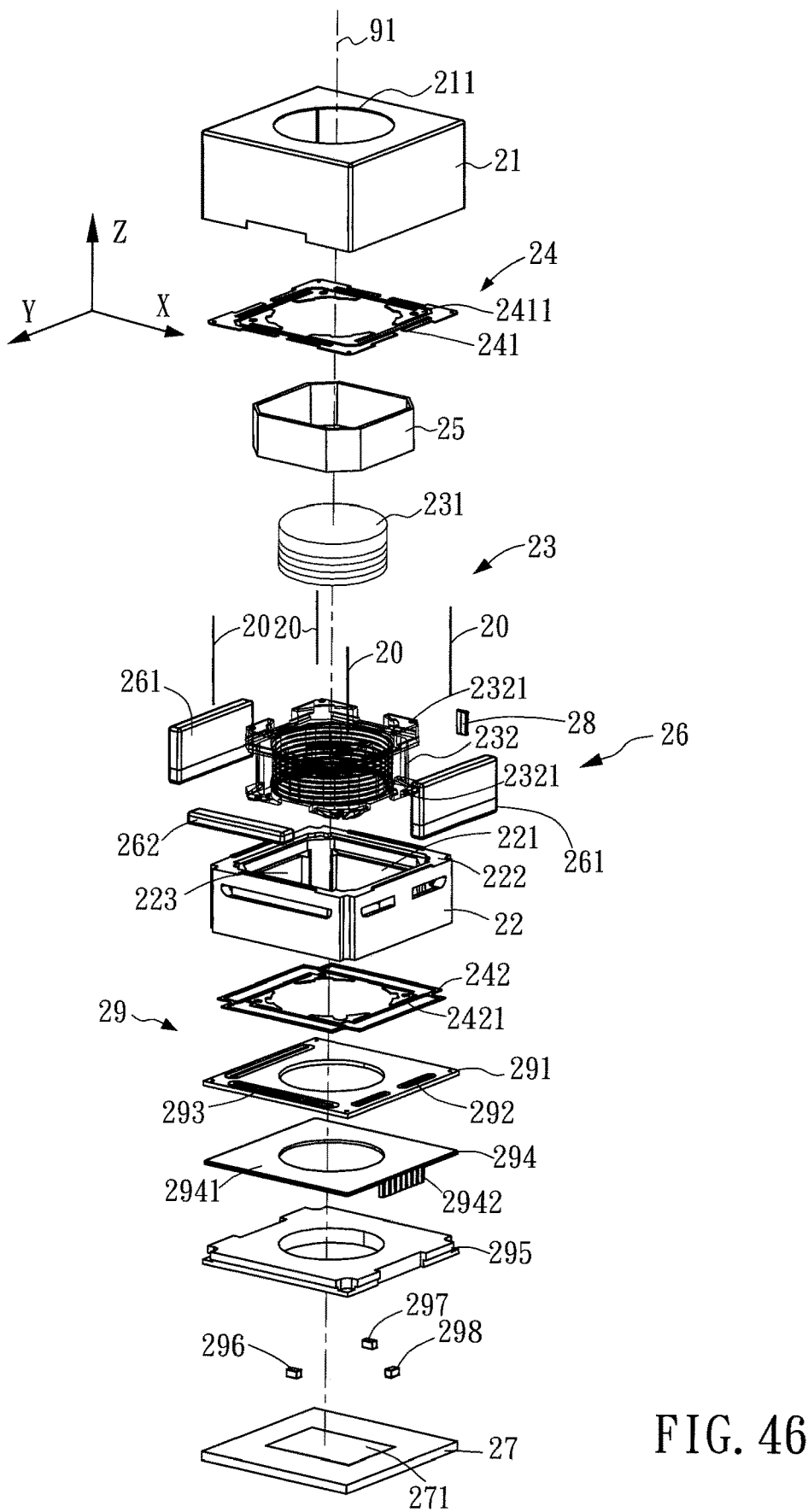
FIG. 46 is a schematic exploded view of a twenty-first preferred embodiment of the moving-coil closed-loop auto-focusing module with low magnetic interference in accordance with the present invention.
Figure 47A:
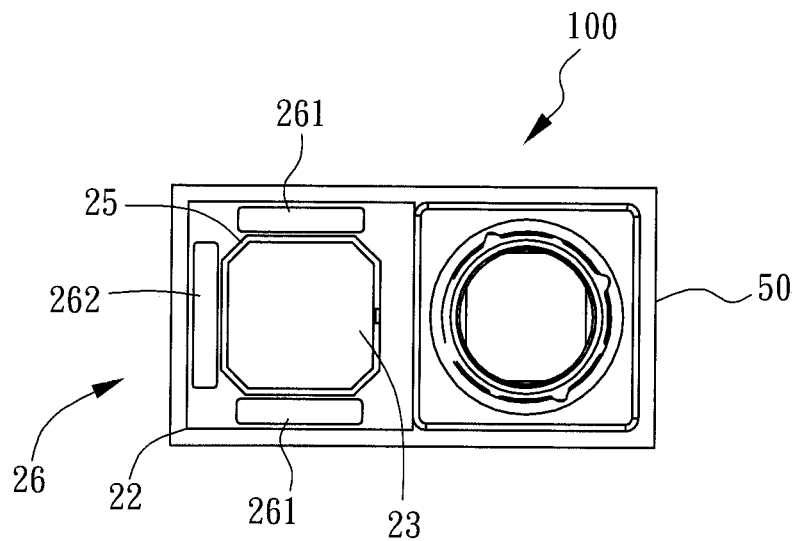
FIG. 47A is a schematic top view of the twenty-first preferred embodiment of the moving-coil closed-loop auto-focusing module with low magnetic interference in accordance with the present invention.
Figure 47B:
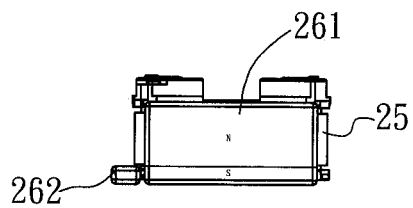
FIG. 47B is a schematic side view of FIG. 47A.
Figure 47C:
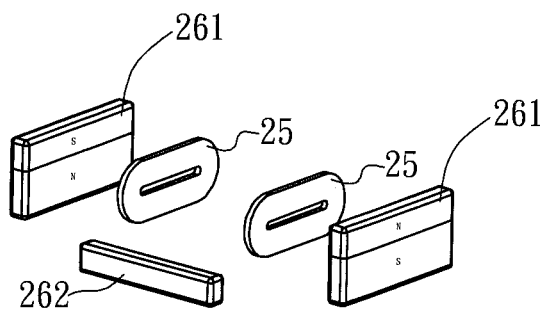
FIG. 47C is a schematic exploded view of a variation of the coil and the driving magnet of the twenty-first preferred embodiment of the moving-coil closed-loop auto-focusing module with low magnetic interference in accordance with the present invention.

In the present invention, by providing a gap to separate the driving magnets located at three continuous surfaces, and arranging a dipolar sensor magnet 28 onto the gap surface, the distance to separate the driving magnets would be enough to reduce the magnetic interference, thus a dual-lens module can be introduced preferably. Refer now to FIG. 46, FIG. 47A, FIG. 47B and FIG. 47C; where FIG. 46 is a schematic exploded view of a twenty-first preferred embodiment of the moving-coil closed-loop auto-focusing module with low magnetic interference in accordance with the present invention, FIG. 47A is a schematic top view of the twenty-first preferred embodiment of the moving-coil closed-loop auto-focusing module with low magnetic interference in accordance with the present invention, FIG. 47B is a schematic side view of FIG. 47A, and FIG. 47C is a schematic exploded view of a variation of the coil and the driving magnet of the twenty-first preferred embodiment of the moving-coil closed-loop auto-focusing module with low magnetic interference in accordance with the present invention.

The difference between the twenty-first preferred embodiment of the moving-coil closed-loop auto-focusing module with low magnetic interference and the twelfth preferred embodiment of FIG. 29 is that, as shown in FIG. 46, this twenty-first preferred embodiment as a dual-lens tri-axial closed-loop OIS includes at least one dipolar sensor magnet 28 having a magnetizing direction parallel to the optical image-capturing axis 91 or perpendicular to the optical image-capturing axis 91 (the tangential direction) and mounted at a preset position on the lens module 23. The second electromagnetic driving module 29 further includes a Z-axial sensor 298. The Z-axial sensor 298, mounted at a lateral side of the base frame 22 lateral side and located above the external circuit 27, is electrically coupled with the external circuit 27, and further corresponds to the dipolar sensor magnet 28 so as to detect the movement of the lens module 23 in the Z-axial direction. In addition, another difference thereof is that the X-axial coil 292 of the second electromagnetic driving module 29 is a pair of two opposing coils on the circuit board 291.

As shown in FIG. 47A, in this twenty-first preferred embodiment of the moving-coil closed-loop auto-focusing module with low magnetic interference, the structure having driving magnets at three consecutive surfaces is formulated by two opposing main driving magnets 261 and one auxiliary driving magnet 262. Namely, three of four lateral sides of the base frame 22 are mounted with corresponding driving magnets 26, and the rest lateral side thereof is to engage a lens module 50. Here, a dual-lens module 100 can be applied to prevent from interference of magnetic fields. Another lens module 50 can be similar mounted with the gap surfaces thereof to face each other, or an anti-shake lens module can be applied.

As shown in FIG. 47B, in this twenty-first preferred embodiment of the moving-coil closed-loop auto-focusing module with low magnetic interference, the two main driving magnets 261 are both dipolar driving magnets. Each of the two main driving magnets 261 has two N/S magnetic poles having different volumes and heights. The lower magnetic pole (S-pole) of the main driving magnet 261 at a height approximately equal to that of the auxiliary driving magnet 262 is in charge of a lateral push in the X-axial or Y-axial direction, while the other magnetic pole (upper N-pole) thereof is in charge of an upward push upon the lens module 23.

As shown in FIG. 47C, the two main driving magnets 261 are both dipolar magnets. Each of the two main driving magnets 261 has two N/S magnetic poles having different volumes and heights. The N/S magnetic polarities of the two main driving magnets 261 are contrary. One pole of the main driving magnet 261 is in charge of a lateral push in the X-axial or Y-axial direction, while another magnetic pole thereof is in charge of an upward push upon the lens module 23. In addition, the coil 25 can be two opposing plate-type dipolar coils or PCBs.

Figure 48:
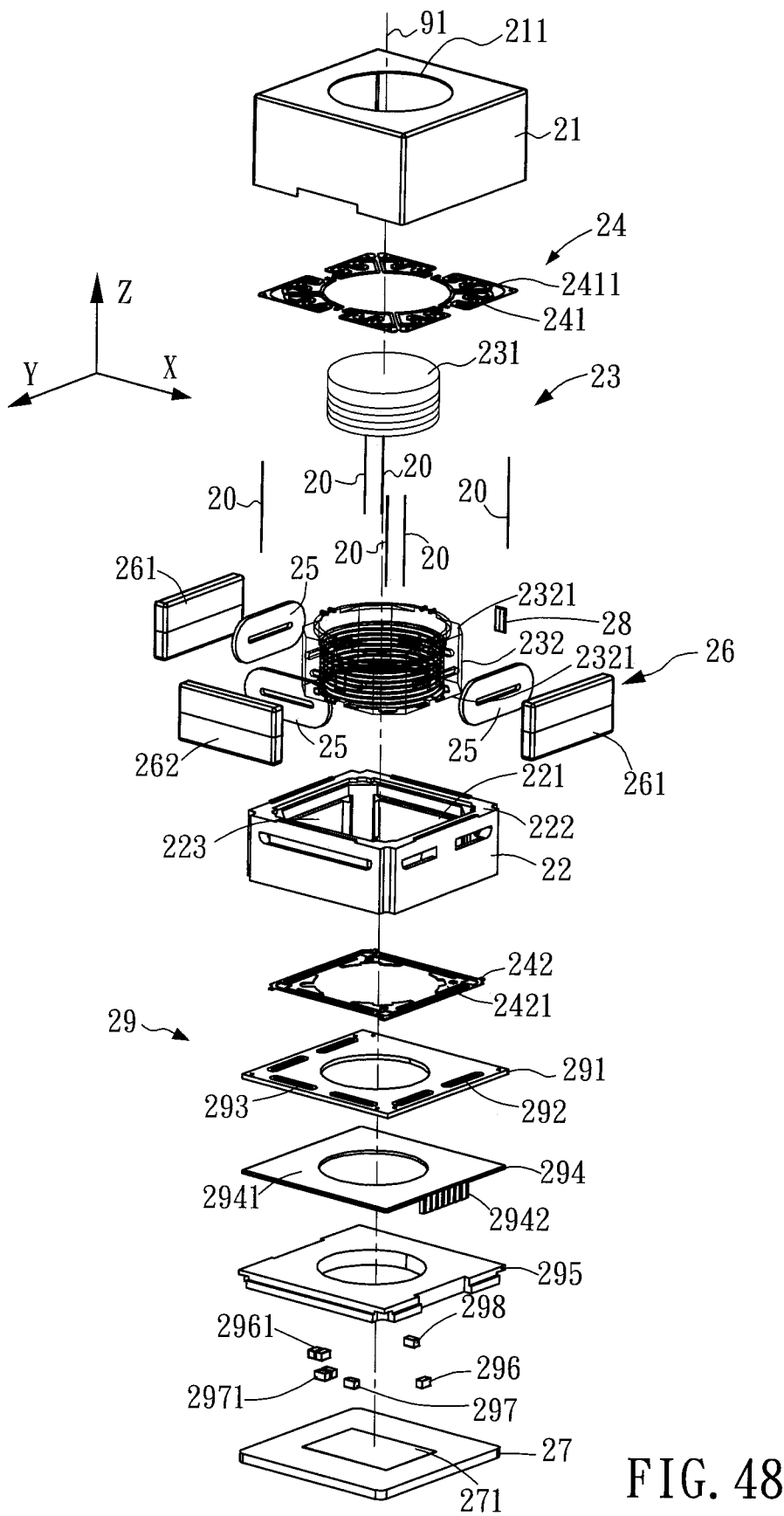
FIG. 48 is a schematic exploded view of a twenty-second preferred embodiment of the moving-coil closed-loop auto-focusing module with low magnetic interference in accordance with the present invention.
Figure 49:
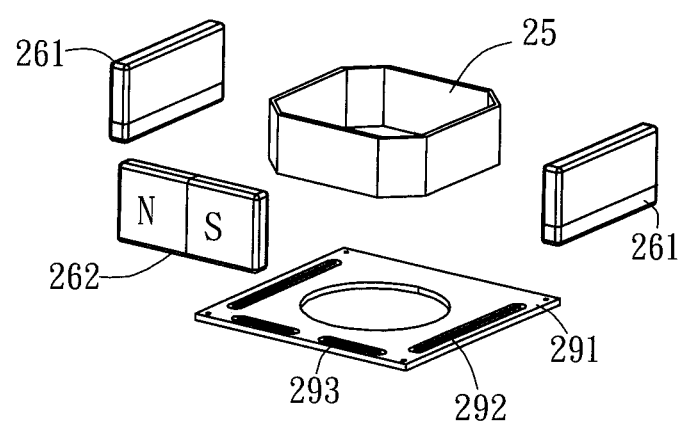
FIG. 49 is a schematic exploded view of a first variation of the coil, the driving magnet and the circuit board of the twenty-second preferred embodiment of the moving-coil closed-loop auto-focusing module with low magnetic interference in accordance with the present invention.
Figure 49A:
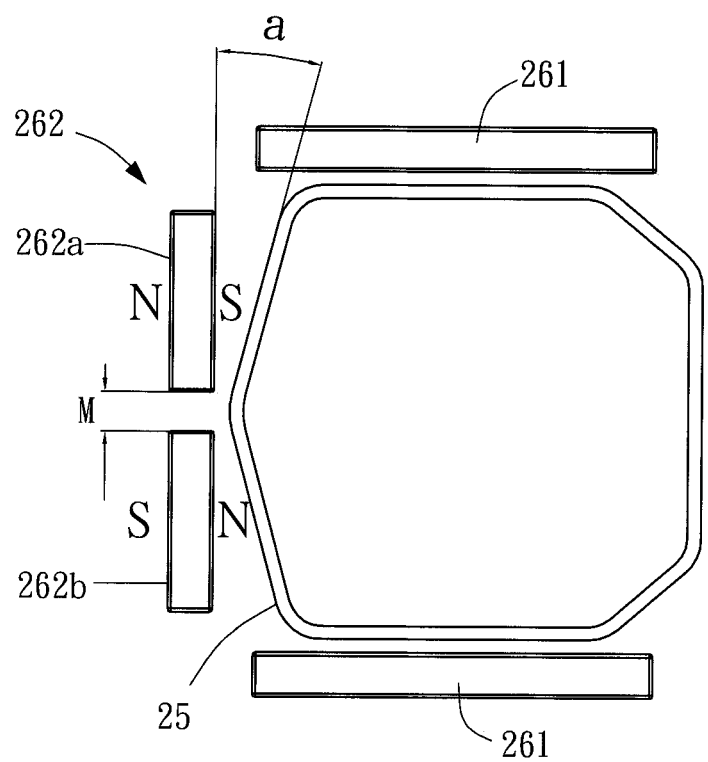
FIG. 49A is a schematic view of a second variation of the coil and the driving magnet of the twenty-second preferred embodiment of the moving-coil closed-loop auto-focusing module with low magnetic interference in accordance with the present invention.
Figure 49B:
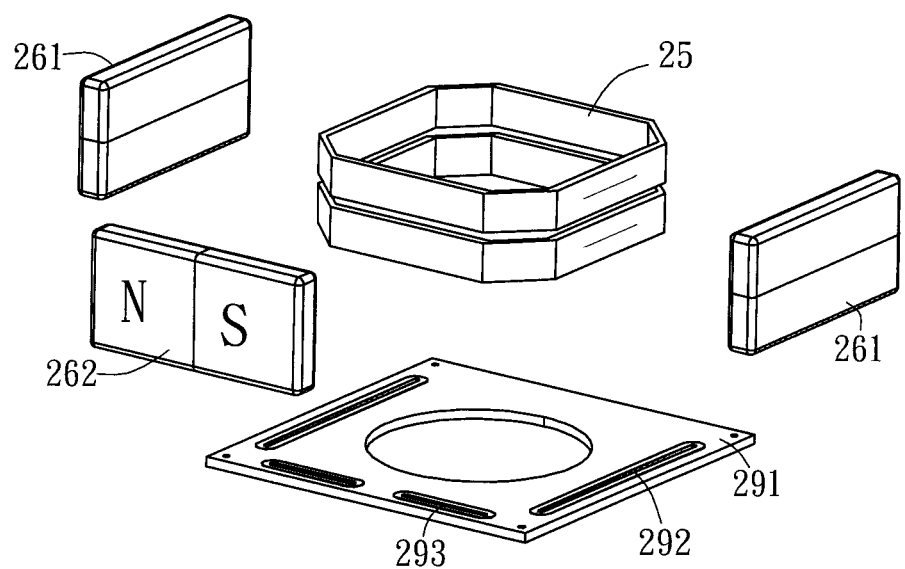
FIG. 49B is a schematic view of a third variation of the coil, the driving magnet and the circuit board of the twenty-second preferred embodiment of the moving-coil closed-loop auto-focusing module with low magnetic interference in accordance with the present invention.

Refer now to FIG. 48, FIG. 49, FIG. 49A and FIG. 49B; where FIG. 48 is a schematic exploded view of a twenty-second preferred embodiment of the moving-coil closed-loop auto-focusing module with low magnetic interference in accordance with the present invention, FIG. 49 is a schematic exploded view of a first variation of the coil, the driving magnet and the circuit board of the twenty-second preferred embodiment of the moving-coil closed-loop auto-focusing module with low magnetic interference in accordance with the present invention, FIG. 49A is a schematic view of a second variation of the coil and the driving magnet of the twenty-second preferred embodiment of the moving-coil closed-loop auto-focusing module with low magnetic interference in accordance with the present invention, and FIG. 49B is a schematic view of a third variation of the coil, the driving magnet and the circuit board of the twenty-second preferred embodiment of the moving-coil closed-loop auto-focusing module with low magnetic interference in accordance with the present invention.

As shown in FIG. 48, the difference between the twenty-second preferred embodiment of the moving-coil closed-loop auto-focusing module with low magnetic interference and the twenty-first preferred embodiment of FIG. 46 is that, in this embodiment, the moving-coil closed-loop auto-focusing module with low magnetic interference as a dual-lens five-axial closed-loop OIS includes the second electromagnetic driving module 29, which further includes two opposing pairs of two collinear X-axial coils 292, at least one pair of Y-axial coils 293, two corresponded second X-axial sensors 2961, and two corresponded second Y-axial sensors 2971.

The two opposing pairs of two collinear X-axial coils 292 and the at least one pair of Y-axial coils 293 are neighbored and perpendicular to each other on the circuit board 291. The X-axial sensor 296 is located between two collinear X-axial coils 292 of the same pair, while the two corresponded second X-axial sensors 2961 are located between the two collinear X-axial coils 292 of the pair opposing to the pair that contains the X-axial sensor 296. Thereupon, the magnetic field of the main driving magnet 261 can be detected, and the tilt angle about the Y axis can be further derived through relevant transform algorithms. The Y-axial sensor 297 is located between the two Y-axial coils 293, while the two corresponded second Y-axial sensors 2971 are located between the two Y-axial coils 293 for detecting the magnetic field of the auxiliary driving magnet 262. Further, the tilt angle about the X axis can be further derived through relevant transform algorithms. The X-axial sensor 296, the Y-axial sensor 297, the two corresponded second X-axial sensors 2961 and the two corresponded second Y-axial sensors 2971 are all mounted on the external circuit 27. In addition, another difference thereof is that the coil 25 is a plate-type dipolar coil or a PCB, the auxiliary driving magnet 262 and the main driving magnet 261 are almost the same in size, and the auxiliary driving magnet 262 and the main driving magnet 261 are both dipolar magnets. Further, the suspension wires 20 are included to provide electric conduction and to control the lens module 23 to perform Z-axial motion and correct the tilt angles about the X-axis and the Y axis.

As shown in FIG. 49, the difference in arranging the coil, the driving magnets and the circuit board between this embodiment and that of FIG. 48 is that, in this embodiment, the auxiliary driving magnet 262 is a dipolar magnet with the N/S magnetic poles to be horizontally arranged, while the main driving magnet 261 is also a dipolar magnet with the N/S magnetic poles to be vertically arranged. In addition, the coil 25 is an annular monopolar coil. Another difference is that, in this embodiment, the second electromagnetic driving module 29 further includes two opposing X-axial coils 292, and two collinear Y-axial coils 293 perpendicular to each of the two opposing X-axial coils 292. The X-axial coils 292 and the Y-axial coils are all mounted on the circuit board 291.

In order to increase lateral pushing, the height (volume) of the auxiliary driving magnet 262 can be increased, without the need of equaling the height thereof to the main driving magnet 261. On the other hand, in order not to produce unbalanced upward pushing caused by the increase in mass of the driving magnets 26, the auxiliary driving magnet 262 can be set to be radially dipolar magnetized. Thereupon, when the annular driving coil 25 is activated, the dipolarity of the auxiliary driving magnet 262 would cancel the one-side upward pushing, such that motional balance about the Z axis can be kept. Namely, the tri-axial unbalanced pushing induced by these three driving magnets 26 can thus be resolved. Under the auxiliary driving magnet 262, the two Y-axial coils 293 for horizontal movement are located. By applying a positive/negative cycle of current to the auxiliary driving magnet 262, horizontal pushing would be induced. However, the dipolar arrangement upon the auxiliary driving magnet 262 would result in a slight rotation about the transverse axis (X or Y axis).

As shown in FIG. 49A, since the auxiliary driving magnet 262 is not to provide upward pushing, thus an angular deflection can be made to the annular coil 25 neighboring the auxiliary driving magnet 262 so as to increase the action distance between the coil 25 and the auxiliary driving magnet 262. A nearest point is defined at a center point of the auxiliary driving magnet 262 in correspondence to the angle formed at the coil 25. Then, the auxiliary driving magnet 262 is cut into two monopolar auxiliary driving magnets 262a, 262b at the nearest point. By keeping a gap M at the nearest point so as to separate the two monopolar auxiliary driving magnets 262a, 262b, thus rotational forcing to generate the aforesaid rotation can be reduced. As shown in FIG. 49B, similar to the aforesaid improvement on erasing the rotational forcing, the annular coil 25 is set to be dipole, such that the rotational forcing induced by the dipole annular coil 25 and that caused by the dipole auxiliary driving magnet 262 would cancel each other.

Figure 50:
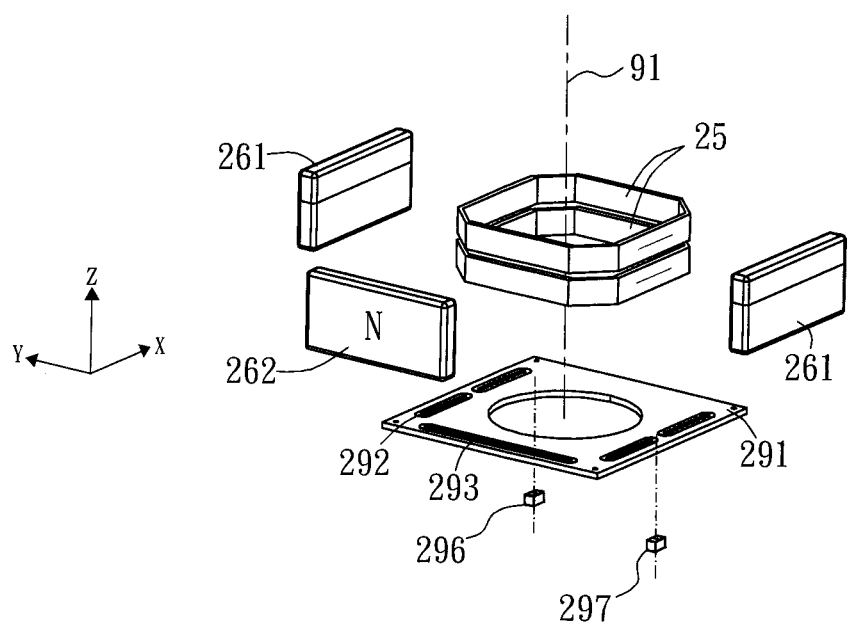
FIG. 50 is a schematic exploded view of a fourth variation of the coil, the driving magnet and the circuit board of the twenty-second preferred embodiment of the moving-coil closed-loop auto-focusing module with low magnetic interference in accordance with the present invention.
Figure 50A:
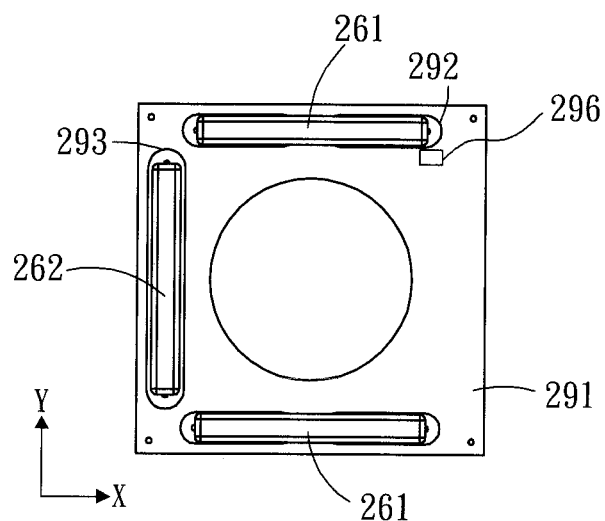
FIG. 50A is a schematic top view of the fourth variation of the coil, the driving magnet and the circuit board of the twenty-second preferred embodiment of the moving-coil closed-loop auto-focusing module with low magnetic interference in accordance with the present invention.
Figure 50B:
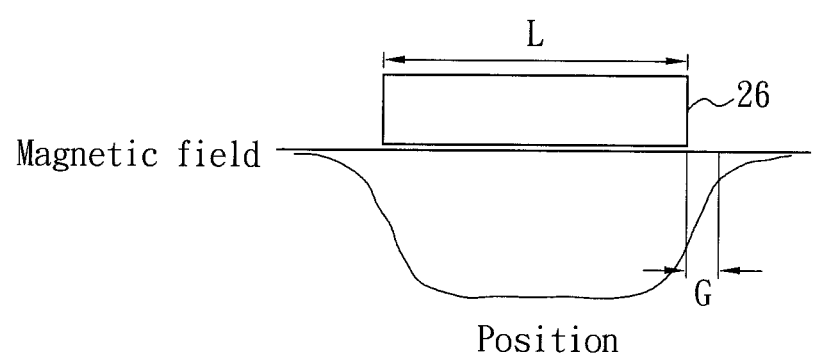
FIG. 50B is another view of FIG. 50A, showing also relationships between the position and the magnetic field detected by the X-axial sensor.
Figure 51:
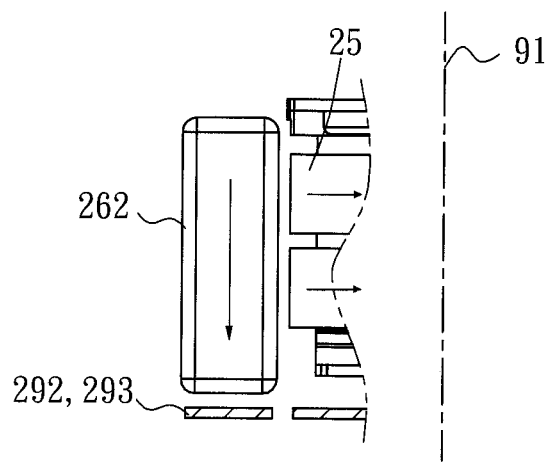
FIG. 51 is a schematic lateral cross-sectional view of the fourth variation of the coil, the driving magnet and the circuit board of the twenty-second preferred embodiment of the moving-coil closed-loop auto-focusing module with low magnetic interference in accordance with the present invention.

Refer now to FIG. 50, FIG. 50A, FIG. 50B and FIG. 51; where FIG. 50 is a schematic exploded view of a fourth variation of the coil, the driving magnet and the circuit board of the twenty-second preferred embodiment of the moving-coil closed-loop auto-focusing module with low magnetic interference in accordance with the present invention, FIG. 50A is a schematic top view of the fourth variation of the coil, the driving magnet and the circuit board of the twenty-second preferred embodiment of the moving-coil closed-loop auto-focusing module with low magnetic interference in accordance with the present invention, FIG. 50B is another view of FIG. 50A showing also relationships between the position and the magnetic field detected by the X-axial sensor, and FIG. 51 is a schematic lateral cross-sectional view of the fourth variation of the coil, the driving magnet and the circuit board of the twenty-second preferred embodiment of the moving-coil closed-loop auto-focusing module with low magnetic interference in accordance with the present invention.

As shown in FIG. 50, in order to increase push forcing from a single auxiliary driving magnet 262, the volume (height) of the magnet is increased. In addition, the main driving magnet 261 is a dipolar magnet with a radial magnetizing direction, the coil 25 is a dipolar annular coil, and the auxiliary driving magnet 262 is a monopolar magnet also with a radial magnetizing direction to face the dipolar annular coil 25. The interaction between the monopolar auxiliary driving magnet 262 and the dipolar annular coil would induce both upward and downward pushing upon the coil 25, and these two push forcing would cancel each other. Thereupon, the push along the optical image-capturing axis 91 would be simply provided by the main driving magnet 261, and thus the tri-axial unbalanced pushing induced by these three driving magnets 26 can be resolved.

As shown in FIG. 50A, in order to ensure the horizontal movement, the bottom coil for horizontal push (X-axial coil 292 or Y-axial coil 293) shall be well utilized. Since the Hall sensor (X-axial sensor 296 or Y-axial sensor 297) is required under the driving magnets 26 to establish closed-looping, and in order to prevent the sensor from interference by additional magnet fields, the coil for horizontal movement shall be divided into two coils to get away from the Hall sensor. Since the action area for the divided coil (X-axial coil 292 or Y-axial coil 293) is reduced, thus the horizontal push forcing would be decayed. Hence, by maintaining the mounting of the single coil for horizontal movement, the Hall sensor would be located to a corner of the magnet by perpendicular to the coil 25. Also shown in FIG. 50A, the Y-axial coil 293 under the auxiliary driving magnet 262 is a single coil, the X-axial sensor 296 for detecting the X-axial movement is located to a lateral side of the main driving magnet 261. Similarly, the X-axial coil 292 for Y-axial movement can be a single coil, and the Y-axial sensor 297 for detecting the Y-axial movement can be located to a corner of the auxiliary driving magnet 262.

As shown in FIG. 50B, the curve in the figure under the driving magnet 26 having a length L shows variation of the magnetic flux density detected by the driving magnet 26. Two linear sections G of the curve (one labeled in the figure) exist at two lateral side of the driving magnet 26. By applying two or one of these linear sections and relevant transformation algorithms, the corresponding horizontal position of the lens module 23 can be precisely located.

As shown in FIG. 51, in order to increase push forcing from a single auxiliary driving magnet 262, the volume (height) of the magnet is increased. In addition, the main driving magnet 261 has a radial magnetizing direction. The magnetizing direction of the auxiliary driving magnet 262 is parallel to the optical image-capturing axis 91. Thus, by having the magnetic field of the magnetizing surface to be concentrated, a stronger and direct energy can be applied to the coil for horizontal movement (X-axial coil 292 or Y-axial coil 293), so that the horizontal push forcing can be effectively raised. By having the magnetizing direction of the auxiliary driving magnet 262 to be parallel to the optical image-capturing axis 91, then the upward push forcing can be simply provided by the two main driving magnets 261, which is in charge of balancing the upward motion. Thereupon, the tri-axial unbalanced pushing induced by these three driving magnets 26 can thus be resolved.

Figure 52:
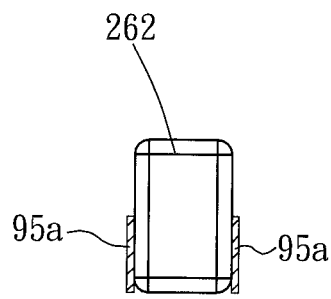
FIG. 52 is a schematic view of a variation of the auxiliary driving magnet of the twenty-second preferred embodiment of the moving-coil closed-loop auto-focusing module with low magnetic interference in accordance with the present invention.

Referring now to FIG. 52, a schematic view of a variation of the auxiliary driving magnet of the twenty-second preferred embodiment of the moving-coil closed-loop auto-focusing module with low magnetic interference in accordance with the present invention is shown. In this embodiment, the auxiliary driving magnet 262 has a magnetic field radial to at least one yoke 95a surface-mounted on the auxiliary driving magnet 262. A height of the yoke 95a is shorter than a half height of the auxiliary driving magnet 262. By arranging the yoke 95a close to the coil 25, then the magnetic field for axial pushing induced by a single-side magnet can be ensured, the magnetic loss can be minimized, and the push forcing can be stabilized.

Figure 53:
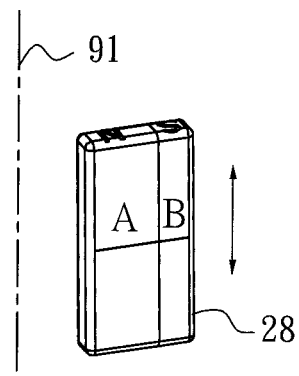
FIG. 53 is a schematic view of a variation of the sensor magnet of the twenty-second preferred embodiment of the moving-coil closed-loop auto-focusing module with low magnetic interference in accordance with the present invention.

Referring now to FIG. 53, a schematic view of a variation of the sensor magnet of the twenty-second preferred embodiment of the moving-coil closed-loop auto-focusing module with low magnetic interference in accordance with the present invention is shown. As shown in FIG. 53, in this twenty-second preferred embodiment, the magnetizing direction of the dipolar sensor magnet 28 is parallel to the optical image-capturing axis 91. Also, symmetricity in size of the two magnetic poles A, B of the dipolar sensor magnet 28 is not required, and asymmetrical magnetization thereof is not demanded, either.

Figure 54:
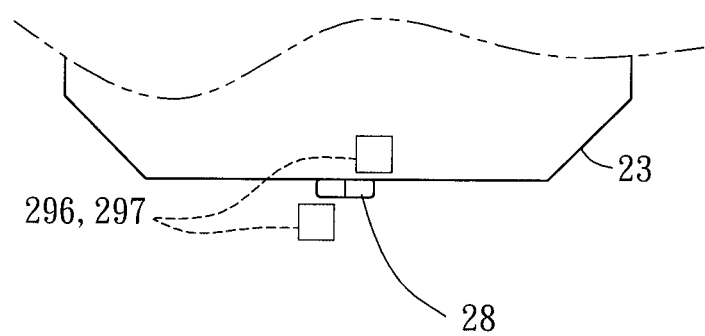
FIG. 54 is a schematic view of an arrangement of the sensor magnet and the sensor of the twenty-second preferred embodiment of the moving-coil closed-loop auto-focusing module with low magnetic interference in accordance with the present invention.

Referring now to FIG. 54, a schematic view of an arrangement of the sensor magnet and the sensor of the twenty-second preferred embodiment of the moving-coil closed-loop auto-focusing module with low magnetic interference in accordance with the present invention is shown. As shown in FIG. 54, the two sensors (X-axial sensor 296 or Y-axial sensor 297) are located under the sensor magnet 28 to positions close to the N/S-poles thereof, respectively, and detect individually the N/S magnetic field. By applying relevant transformation algorithms to obtain a larger bandwidth, the identification upon the displacement can be easily performed.

Figure 55:
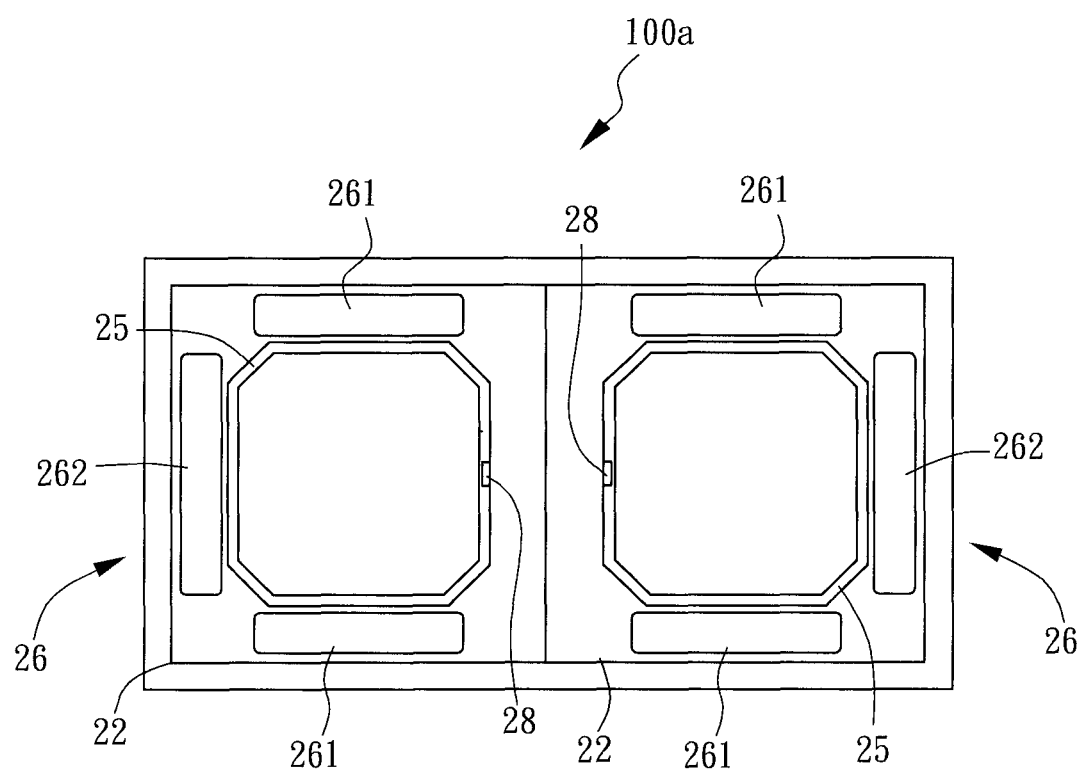
FIG. 55 is a schematic view of a construction of the dual-lens module of the twenty-second preferred embodiment of the moving-coil closed-loop auto-focusing module with low magnetic interference in accordance with the present invention.

Referring now to FIG. 55, a schematic view of a construction of the dual-lens module of the twenty-second preferred embodiment of the moving-coil closed-loop auto-focusing module with low magnetic interference in accordance with the present invention is shown. In this twenty-second preferred embodiment of the moving-coil closed-loop auto-focusing module with low magnetic interference, the base frame 22 have a gap surface and three consecutive surfaces for mounting the driving magnets 26, and the dipolar sensor magnet 28 is disposed onto the gap surface. A dual-lens module 100a can be structured by integrating two same structures of twenty-second preferred embodiment of the moving-coil closed-loop auto-focusing module with low magnetic interference, by having the respective gap surfaces of the corresponding lens modules 23 to face each other. Thereupon, the distance between the dipolar sensor magnet 28 and each of the driving magnets 26 can be made longer, and thus the magnetic interference can be reduced. Since individual magnetic fields of the two modules would be prevented from interference, thus the dual-lens module 100a can be well established.

In summary, the moving-coil closed-loop auto-focusing module with low magnetic interference provided by the present invention is defined with an X axis, a Y axis and a Z axis, perpendicular to each other, and has an optical image-capturing axis 91 parallel to the Z axis. The moving-coil closed-loop auto-focusing module with low magnetic interference includes an upper cover 21, a base frame 22, a lens module 23, an elastic module 24, at least one coil 25, at least one pair of two opposing driving magnets 26, an external circuit 27 and at least one sensor magnet 28. The upper cover 21 includes a through hole 211. The base frame 22 and the upper cover 21 are engaged to form an internal accommodation space 221. The lens module 23 is located inside the accommodation space 221. The elastic module 24 includes an upper spring plate 241 and a lower spring plate 242 to clamp the lens module 23 within the base frame 22 and further to elastically confine the lens module 23 in the accommodation space 221 to be slidable along the optical image-capturing axis 91. The coil 25 surrounds the lens module 23. The two driving magnets 26 are individually mounted at respective sides of the base frame 22 in correspondence with the coil 25. The external circuit 27 located under the base frame 22 includes an image-sensing element 271 and at least one sensor 272. The sensor magnet 28 furnished peripherally to the lens module 23 has magnetic lines parallel to the optical image-capturing axis 91. Thereupon, a magnetizing surface of the sensor magnet 28 can face downward to align the sensor 272 on the external circuit 27.

While the present invention has been particularly shown and described with reference to a preferred embodiment, it will be understood by those skilled in the art that various changes in form and detail may be without departing from the spirit and scope of the present invention.

What is claimed is:

1. A moving-coil closed-loop auto-focusing module with low magnetic interference, defined with an X axis, a Y axis and a Z axis, perpendicular to each other, having an optical image-capturing axis parallel to the Z axis, comprising:
   an upper cover, including a through hole;
   a base frame, engaging the upper cover to form an internal accommodation space;
   a lens module, located inside the accommodation space;
   an elastic module, clamping the lens module, confining the lens module to be slidable along the optical image-capturing axis within the accommodation space;
   at least one coil, surrounding the lens module;
   at least one pair of two opposing driving magnets, mounted on respective lateral sides of the base frame in correspondence with the coil;
   an external circuit, located under the base frame, including an image- sensing element and at least one sensor; and
   at least one sensor magnet, located peripherally to the lens module, having a magnetizing surface thereof to face downward to align the at least one sensor on the external circuit, so that the sensor is able to detect magnetism of the at least one sensor magnet for further being applied to detect a relative displacement between the lens module and the external circuit;
   wherein:
   the lens module further includes a lens set and a lens carrier, the lens set being located in a central place of the lens carrier to displace synchronously with the lens carrier;
   the sensor magnet having a magnetizing direction parallel to the optical image-capturing axis is one of a monopolar sensor magnet and a dipolar sensor magnet, the sensor magnet being built integrally as a unique piece or consisted of another two monopolar sensor magnets if the sensor magnet is the dipolar sensor magnet, the sensor magnet being symmetrically or asymmetrically magnetized if the sensor magnet is the dipolar sensor magnet;
   the driving magnet is one of a monopolar driving magnet and a dipolar driving magnet, polarities of the driving magnet being the same or contrary if the driving magnet is the dipolar driving magnet, the driving magnet being symmetrically or asymmetrically magnetized if the driving magnet is the dipolar driving magnet;
   the coil is one of an annular monopole coil and an annular dipolar coil or one of a dipolar coil and a PCB;
   the at least one pair of two opposing driving magnets includes two said pairs of two opposing driving magnets, each said pair having two driving magnets, said two pairs of two opposing driving magnets being individually and evenly mounted into respective lateral mounting grooves at corresponding lateral sides of the base frame, or said two pairs of two opposing driving magnets being individually mounted to respective corners of the base frame; and,
   the auto-focusing camera module further includes a yoke mounted between the sensor magnet and the lens module.

2. The auto-focusing camera module of claim 1, wherein the two opposing driving magnets are individually mounted to two diagonal corners of the base frame in correspondence with the coil.

3. The auto-focusing camera module of claim 1, wherein the pairs of two opposing driving magnets are all the dipolar driving magnets with the same or different polarities;
   wherein, when the two pairs of two opposing driving magnets are all the dipolar driving magnets with the same polarity, a magnetic pole of each of the driving magnets that faces the lens module is one of an N/S-pole and an S/N-pole;
   wherein, when two pairs of two opposing driving magnets are all the dipolar driving magnets with different polarities, magnetic poles of the driving magnets that face the lens module are intermittently set between N/S-poles and S/N-poles.

4. The auto-focusing camera module of claim 1, wherein the driving magnets include two opposing main driving magnets, and two opposing auxiliary driving magnets, and the sensor magnet is mounted on the lens module in correspondence with one of the two opposing auxiliary driving magnets.

5. The auto-focusing camera module of claim 4, wherein one of the two opposing auxiliary driving magnets is further cut into halves to produce another two auxiliary driving magnet having the same volume, and the sensor magnet is located at a place between the another two auxiliary driving magnets; wherein magnetizing surfaces of the another two auxiliary driving magnets face the sensor magnet, and magnetism of each of the magnetizing surfaces is one of an N-pole and an S-pole; wherein a magnetizing direction of the sensor magnet is parallel to the optical image-capturing axis, and the sensor magnet is one of a monopolar sensor magnet and a dipolar sensor magnet; wherein, if the sensor magnet is the dipolar sensor magnet, the sensor magnet is built integrally as a unique piece or consisted of another two monopolar sensor magnets, and the sensor magnet is symmetrically or asymmetrically magnetized.

6. The auto-focusing camera module of claim 4, wherein:
the two opposing auxiliary driving magnets are both the dipolar driving magnets, and N/S polarities of the two opposing auxiliary driving magnets (external magnets) are the same or different;
when the N/S polarities of the two opposing auxiliary driving magnets (external magnets) are the same, polarities at magnetizing surfaces of the two opposing auxiliary driving magnets that face the lens module are the same;
when the N/S polarities of the two opposing auxiliary driving magnets (external magnets) are different, polarities at the magnetizing surfaces of the two opposing auxiliary driving magnets that face the lens module are different;
a magnetizing direction of the sensor magnet is parallel to the optical image-capturing axis, the sensor magnet being one of a monopolar sensor magnet and a dipolar sensor magnet; and,
the coil is one of an annular monopole coil and an annular dipolar coil or one of a dipolar coil and a PCB.

7. The auto-focusing camera module of claim 1, wherein:
the at least one pair of two opposing driving magnets include two opposing main driving magnets and at least one auxiliary driving magnet, the two opposing main driving magnet and the auxiliary driving magnet being continuously mounted into three consecutive and neighbored lateral mounting grooves of the base frame, a volume of the auxiliary driving magnet being smaller than that of the main driving magnet, the auxiliary driving magnet being mounted into the lateral mounting groove of the base frame located right between the two opposing main driving magnets;
the auto-focusing camera module further includes a plurality of suspension wires and a second electromagnetic driving module, the suspension wire being featured in elastic suspension and electric conduction, the plurality of suspension wires being together to suspend elastically an assembly of the base frame, the lens module, the elastic module, the coil and the driving magnets over the second electromagnetic driving module;
the second electromagnetic driving module further includes a circuit board, two opposing pairs of two collinear X-axial coils, at least one Y-axial coil, a connection plate, a base plate, an X-axial sensor and a Y-axial sensor, the two opposing pairs of two collinear X-axial coils being perpendicular to the at least one Y-axial coil on the circuit board, the X-axial sensor being located between the two collinear X-axial coils in the same pair, the Y-axial sensor being respective to the at least one Y-axial coil, the X-axial sensor and the Y-axial sensor being mounted on and thus electrically coupled with the external circuit; and,
the second electromagnetic driving module further includes a Z-axial sensor, the Z-axial sensor being mounted to the base frame and electrically coupled with the external circuit in correspondence with the sensor magnet on the lens module so as to detect a Z-axial movement of the lens module.

8. The auto-focusing camera module of claim 4, wherein each of the two opposing main driving magnets is one of a dipolar main driving magnet and a monopolar main driving magnet, and one of the two opposing main driving magnets is cut into halves evenly to produce another two main driving magnets with the same volume located at the same side of the lens module.

9. The auto-focusing camera module of claim 7, wherein the second electromagnetic driving module further includes two corresponded second X-axial sensors and two corresponded second Y-axial sensors, the two corresponded second X-axial sensors being mounted between the two collinear X-axial coils containing no said X-axial sensor so as to detect magnetic fields of the main driving magnets and to derive a tilt angle of the lens module about the Y axis through relevant transformation algorithms, the two corresponded second Y-axial sensors being mounted close to the Y-axial coil so as to detect a magnetic field of the auxiliary driving magnet and to derive another tilt angle of the lens module about the X axis through another relevant transformation algorithms.

10. The auto-focusing camera module of claim 1, wherein the auto-focusing camera module has a gap surface containing no said driving magnet, and the sensor magnet is mounted on the gap surface.

11. The auto-focusing camera module of claim 1, further including two sensors (Hall sensors) individually mounted under the sensor magnet and aside to two opposing ends of the sensor magnet for detecting individually N/S magnetic fields, obtaining a larger bandwidth through transformation algorithms, and further identifying displacements of the lens module.

12. The auto-focusing camera module of claim 1, wherein the at least one sensor magnet is consisted of two said sensor magnets, and the at least one sensor is consisted of two said sensors located in correspondence with the two sensor magnets, the two sensors being individually mounted to two opposing lateral sides of the lens module, the two sensor magnets being individually mounted to the two opposing lateral sides of the lens module, the two sensors being to detect respective N/S magnetic fields of the corresponding two sensor magnets so as to obtain a tilt angle of the lens module.

13. The auto-focusing camera module of claim 1, wherein the at least one sensor magnet is consisted of two said sensor magnets, and the at least one sensor is consisted of two said sensors located in correspondence with the two sensor magnets, the two sensors being individually mounted to two neighboring lateral sides of the lens module, the two sensor magnets being individually mounted to the two neighboring lateral sides of the lens module, the two sensors being to detect respective N/S magnetic fields of the corresponding two sensor magnets so as to correct a position of the lens module.

14. The auto-focusing camera module of claim 10, wherein, as two said auto-focusing camera modules having the gap surfaces are integrated into a dual-lens module, the two gap surfaces of the corresponding two auto-focusing camera modules are neighbored and face to each other.

15. The auto-focusing camera module of claim 7, wherein the at least one Y-axial coil under the auxiliary driving magnet is simply a coil, the X-axial sensor for detecting X-axial movement of the lens module is mounted aside to the main driving magnet, the two opposing pairs of two collinear X-axial coils for detecting Y-axial movement of the lens module is integrated to be a unique coil, the Y-axial sensor for detecting the same Y-axial movement is mounted to a corner of the auxiliary driving magnet.

16. A moving-coil closed-loop auto-focusing module with low magnetic interference, defined with an X axis, a Y axis and a Z axis, perpendicular to each other, having an optical image-capturing axis parallel to the Z axis, comprising:

an upper cover, including a through hole;
a base frame, engaging the upper cover to form an internal accommodation space;
a lens module, located inside the accommodation space;
an elastic module, clamping the lens module, confining the lens module to be slidable along the optical image-capturing axis within the accommodation space;
at least one coil, surrounding the lens module;
at least one pair of two opposing driving magnets, mounted on respective lateral sides of the base frame in correspondence with the coil;
an external circuit, located under the base frame, including an image-sensing element and at least one sensor; and
at least one sensor magnet, located peripherally to the lens module, having a magnetizing surface thereof to face downward to align the at least one sensor on the external circuit, so that the sensor is able to detect magnetism of the at least one sensor magnet for further being applied to detect a relative displacement between the lens module and the external circuit;

wherein:

the at least one pair of two opposing driving magnets include two opposing main driving magnets and at least one auxiliary driving magnet, the two opposing main driving magnet and the auxiliary driving magnet being continuously mounted into three consecutive and neighbored lateral mounting grooves of the base frame, a volume of the auxiliary driving magnet being smaller than that of the main driving magnet, the auxiliary driving magnet being mounted into the lateral mounting groove of the base frame located right between the two opposing main driving magnets;

the auto-focusing camera module further includes a plurality of suspension wires and a second electromagnetic driving module, the suspension wire being featured in elastic suspension and electric conduction, the plurality of suspension wires being together to suspend elastically an assembly of the base frame, the lens module, the elastic module, the coil and the driving magnets over the second electromagnetic driving module;

the second electromagnetic driving module further includes a circuit board, two opposing pairs of two collinear X-axial coils, at least one Y-axial coil, a connection plate, a base plate, an X-axial sensor and a Y-axial sensor, the two opposing pairs of two collinear X-axial coils being perpendicular to the at least one Y-axial coil on the circuit board, the X-axial sensor being located between the two collinear X-axial coils in the same pair, the Y-axial sensor being respective to the at least one Y-axial coil, the X-axial sensor and the Y-axial sensor being mounted on and thus electrically coupled with the external circuit; and, the second electromagnetic driving module further includes a Z-axial sensor, the Z-axial sensor being mounted to the base frame and electrically coupled with the external circuit in correspondence with the sensor magnet on the lens module so as to detect a Z-axial movement of the lens module.

\* \* \* \* \*